US012717402B2

(12) United States Patent
McCall

(10) Patent No.: US 12,717,402 B2
(45) **Date of Patent: *Aug. 25, 2026**

(54) CONVERTING A 2D POSITIONAL INPUT INTO A 3D POINT IN SPACE

(71) Applicant: Magic Leap, Inc., Plantation, FL (US)

(72) Inventor: Marc Alan McCall, Plantation, FL (US)

(73) Assignee: MAGIC LEAP, INC., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 19/046,293

(22) Filed: Feb. 5, 2025

(65) Prior Publication Data

US 2025/0181143 A1 Jun. 5, 2025

Related U.S. Application Data

(63) Continuation of application No. 18/459,811, filed on Sep. 1, 2023, now Pat. No. 12,242,665, which is a (Continued)

(51) Int. Cl.
*G06F 3/01* (2006.01)
*G06F 3/0346* (2013.01)
(Continued)

(52) U.S. Cl.
CPC ............ *G06F 3/011* (2013.01); *G06F 3/0346* (2013.01); *G06F 3/0414* (2013.01); (Continued)

(58) Field of Classification Search
CPC ...... G06F 3/0346; G06F 3/011; G06F 3/0414; G06F 3/0416; G06F 3/048; G06T 19/006; (Continued)

(56) References Cited

U.S. PATENT DOCUMENTS 6,850,221 B1 2/2005 Tickle
10,290,155 B2 5/2019 Dorta et al.
(Continued)

FOREIGN PATENT DOCUMENTS

CA 2992000 A1 7/2019

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Scott D Au
(74) *Attorney, Agent, or Firm* — KLINTWORTH & ROZENBLAT LLP

(57) ABSTRACT

A user may interact and select positions in three-dimensional space arbitrarily through conversion of a two-dimensional positional input into a three-dimensional point in space. The system may allow a user to use one or more user input devices for pointing, annotating, or drawing on virtual objects, real objects or empty space in reference to the location of the three-dimensional point in space within an augmented reality or mixed reality session.

19 Claims, 35 Drawing Sheets

Related U.S. Application Data continuation of application No. 17/745,247, filed on May 16, 2022, now Pat. No. 11,782,499, which is a continuation of application No. 17/125,634, filed on Dec. 17, 2020, now Pat. No. 11,340,695.

(60) Provisional application No. 62/965,728, filed on Jan. 24, 2020.

(51) Int. Cl.

| | |
|---|---|
| ***G06F 3/041*** | (2006.01) |
| ***G06F 3/04812*** | (2022.01) |
| ***G06F 3/04815*** | (2022.01) |
| ***G06T 19/00*** | (2011.01) |

(52) U.S. Cl.
CPC ........ *G06F 3/0416* (2013.01); *G06F 3/04812* (2013.01); *G06F 3/04815* (2013.01); *G06T 19/006* (2013.01); *G06F 2203/04101* (2013.01); *G06T 2219/004* (2013.01)

(58) Field of Classification Search
CPC ......... G06T 17/00; G06T 19/00; G06T 15/00; G06T 11/00
See application file for complete search history.

(56) References Cited

U.S. PATENT DOCUMENTS

| | | | |
|---|---|---|---|
| 10,535,199 | B1 * | 1/2020 | Bond ...................... G06T 15/08 |
| 10,627,625 | B2 | 4/2020 | Hoover et al. |
| 11,079,995 | B1 | 8/2021 | Hulbert et al. |
| 11,340,695 | B2 | 5/2022 | McCall |
| 11,782,499 | B2 | 10/2023 | McCall |
| 2006/0028436 | A1 | 2/2006 | Armstrong |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0257777 | A1 | 10/2013 | Benko et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0132046 | A1 | 5/2016 | Beoughter et al. |
| 2018/0046352 | A1 | 2/2018 | Johnson et al. |
| 2018/0059901 | A1 | 3/2018 | Gullickson |
| 2019/0237044 | A1 | 8/2019 | Day et al. |
| 2021/0232211 | A1 | 7/2021 | McCall |
| 2023/0409108 | A1 | 12/2023 | McCall |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

ANNOTATING ON A FIXED MESH

CONVERTING A 2D POSITIONAL INPUT INTO A 3D POINT IN SPACE

CROSS-REFERENCE TO RELATED APPLICATION(S)

This application is a continuation of U.S. patent application Ser. No. 18/459,811, filed Sep. 1, 2023, entitled "CONVERTING A 2D POSITIONAL INPUT INTO A 3D POINT IN SPACE". U.S. patent application Ser. No. 18/459,811 is a continuation of U.S. patent application Ser. No. 17/745,247, filed May 16, 2022, entitled "CONVERTING A 2D POSITIONAL INPUT INTO A 3D POINT IN SPACE". U.S. patent application Ser. No. 17/745,247 is a continuation of U.S. patent application Ser. No. 17/125,634, filed Dec. 17, 2020, entitled "CONVERTING A 2D POSITIONAL INPUT INTO A 3D POINT IN SPACE". U.S. patent application Ser. No. 17/125,634 is a nonprovisional application of U.S. Provisional Patent App. No. 62/965,728, filed Jan. 24, 2020, entitled "CONVERTING A 2D POSITIONAL INPUT INTO A 3D POINT IN SPACE". This application claims priority to U.S. patent application Ser. No. 18/459,811, U.S. patent application Ser. No. 17/745,247, U.S. patent application Ser. No. 17/125,634, and U.S. Provisional Patent App. No. 62/965,728, filed Jan. 24, 2020, each of which are hereby incorporated herein by reference in their entirety for all purposes.

FIELD OF THE DISCLOSURE

The present disclosure relates to systems and methods to facilitate interactive virtual, augmented or mixed reality environments.

BACKGROUND OF THE DISCLOSURE

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human tactile and visual perception systems are very complex, and producing a VR, AR, or MR technology that facilitates a comfortable, natural-feeling, rich presentation and interaction thereof, of virtual image elements amongst other virtual or real-world imagery elements is challenging. Systems and methods disclosed herein address various challenges related to VR, AR, and MR technology.

SUMMARY OF THE DISCLOSURE

Embodiments of the present disclosure are directed to devices, systems, and methods for facilitating virtual or augmented reality interaction. As one example embodiment, one or more user input devices may be used to interact in a VR, AR, or MR session. Such sessions may include virtual elements or objects in a three-dimensional space. The one or more user input devices may further be used for pointing, selecting, annotating, and drawing, among other actions on virtual objects, real objects or empty space in an AR or MR session. For ease of reading and understanding, certain systems and methods discussed herein refer to an augmented reality environment or other "augmented reality" or "AR" components. These descriptions of augmented reality" or "AR" should be construed to include "mixed reality," "virtual reality," "VR," "MR," and the like, as if each of those "reality environments" were specifically mentioned also.

Further details of features, objects, and advantages of the disclosure are described below in the detailed description, drawings, and claims. Both the foregoing general description and the following detailed description are exemplary and explanatory and are not intended to be limiting as to the scope of the disclosure.

As described herein, the system may be configured for rendering various content, such as interactive virtual interfaces, to a user in a VR, AR, or MR session. The interactive virtual interfaces may be displayed on, for example, a head-mounted display or wearable display device, e.g., as part of eyewear, that projects image information to the user's eyes.

Additionally, design of computer user interfaces that are useable and easily learned by humans is a non-trivial problem for software developers. The various embodiments of the interactive virtual interfaces in a VR, AR, or MR session of the present disclosure are the result of significant research, development, improvement, iteration, and testing. This non-trivial development has resulted in the interactive virtual interfaces described herein which may provide significant cognitive and ergonomic efficiencies and advantages over previous systems. The interactive virtual user interfaces include improved human-computer interactions that may provide reduced mental workloads, improved decision-making, reduced work stress, or the like, for a user. For example, user interaction with the interactive virtual interfaces described herein may enable a user to more quickly access, navigate, assess, analyze, and digest various virtual information than previous VR, AR, or MR systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments including one or more aspects of the appended claims.

In various embodiments, computer-implemented methods are disclosed in which, by one or more processors executing program instructions, one or more aspects of the above- and/or below-described embodiments including one or more aspects of the appended claims are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments including one or more aspects of the appended claims.

BRIEF DESCRIPTION OF THE DRAWINGS

The following drawings and the associated descriptions are provided to illustrate embodiments of the present disclosure and do not limit the scope of the claims. The relative placement of features and elements may have been modified for the purpose of illustrative clarity. Where practical, the same or similar reference numbers denote the same or similar or equivalent structures, features, aspects, or elements, in accordance with one or more embodiments.

The drawings illustrate the design and utility of various embodiments of the present disclosure. It should be noted that the figures are not necessarily drawn to scale and that elements of similar structures or functions are represented by like reference numerals throughout the figures. Understanding that these drawings depict only example embodiments of the disclosure and are not therefore to be considered limiting of its scope, the disclosure will be described and explained with additional specificity and detail through the use of the accompanying drawings in which.

DETAILED DESCRIPTION

Overview

Figure 1:
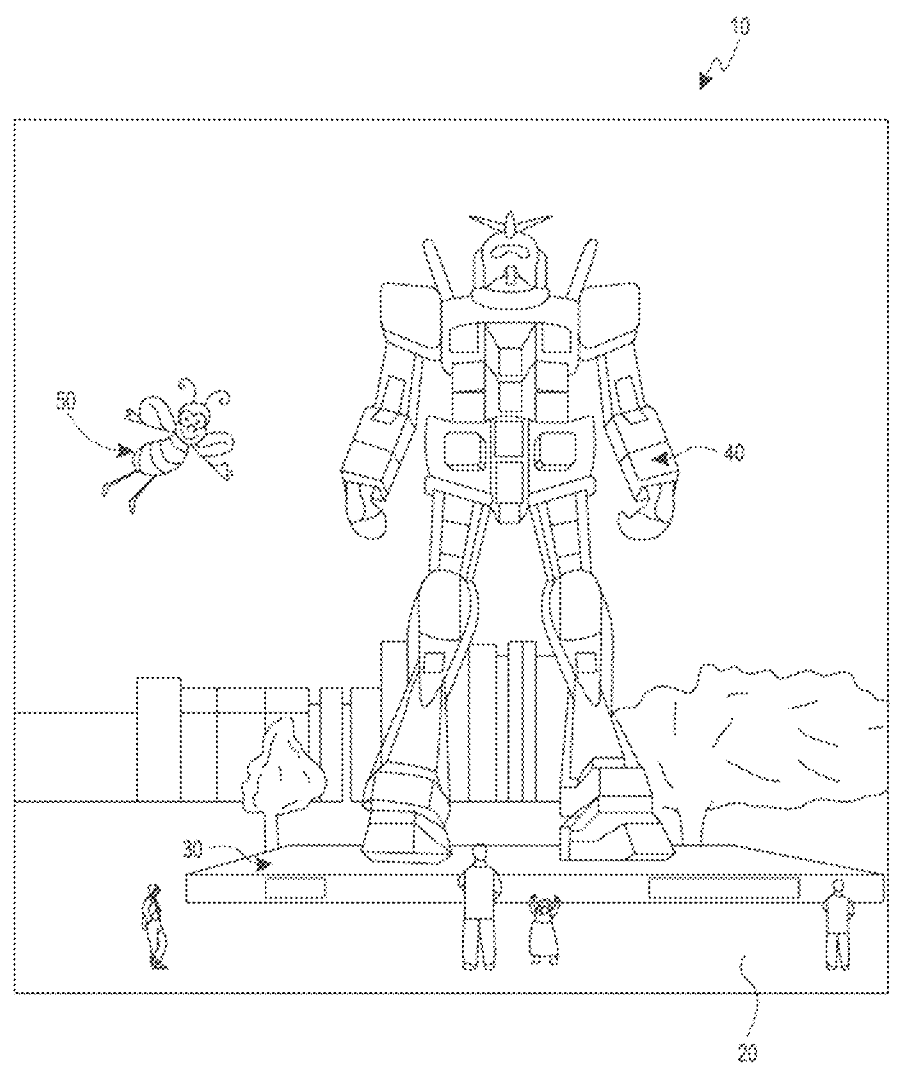
FIG. 1 illustrates a user's view of an example augmented reality (AR) scene through an AR device.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

AR and/or VR systems may display virtual content to a user, or viewer. For example, this content may be displayed on a head-mounted display or a wearable display device, e.g., as part of eyewear, that projects image information to the user's eyes. In addition, where the system is an AR system, the display may also transmit light from the surrounding environment to the user's eyes, to allow a view of that surrounding environment. As used herein, a "head-mounted" or "head mountable" display is a display that may be mounted on the head of a viewer or user. Such displays may be understood to form parts of a display system.

AR and/or VR display systems, may include using a user input device such as a hand-held controller (e.g., a game controller) to interact in the three-dimensional space such as the system described herein. However, interaction and selection within AR and/or VR systems may be limited due to precision, stability, and ergonomic insufficiencies of various game controllers. For example, a game controller with a control stick may be too cumbersome and slow to precisely pinpoint and/or select a target in a three-dimensional space within an AR and/or VR session. Additionally, in an AR and/or VR session the user may often be standing and/or walking around while holding and raising a game controller in the air at length to point, aim, target, amongst other actions in order to properly interact in the augmented reality environment. Such actions may become tiresome and may cause the user's arm to fatigue very quickly. Furthermore, a game controller may be unstable due to the instability of the imprecise input control and/or stick control e.g., game controller stick drift, stick over/under sensitivity etc. A game controller may also have pre-programmed instability assistance to try and account for such issues which may hinder use in an AR and/or VR session as it may over or under correct actions performed in the AR and/or VR sessions.

Accordingly, it may be desirable to design reality systems (e.g., virtual, mixed, and/or augmented) with user input devices that are precise, stable and ergonomic in order to interact in three-dimensional space. Further such a system would allow the user to precisely control, interact and select positions in three-dimensional space arbitrarily based on where the user is looking, thereby facilitating a comfortable, natural-feeling, rich presentation and experience in the AR and/or VR session. Various embodiments of the present technology described herein provide systems and methods to allow the user to precisely control, interact and select positions in three-dimensional space arbitrarily based on where the user is looking. Such methods and systems as further described herein convert a two-dimensional positional input, comprised of a head pose movement compensation and a user input device movement, into a three-dimensional point in space. The three-dimensional point may be fixed to virtual objects, real objects or empty space in an augmented reality session such that precise pointing, annotating, selecting, drawing, among other actions occurs on the virtual objects, real objects or empty space.

Additionally, various embodiments of the present technology described herein are further advantageous as the technology contains features related to tactile feedback, high speed sampling and precision suitable for handwriting, ergonomic design to reduce arm fatigue, ultra-precise sampling of three-dimensional points for meshed environments, quick and seamless connection between universal serial bus (USB) to Bluetooth with no user intervention, easy pluggable design that may feed into existing three-dimensional workflows, among other features.

Example Display Systems

FIG. 1 illustrates a user's view of an example immersive augmented reality scene through an AR device with various virtual reality objects, and physical objects viewed by a user. An AR scene 10 is depicted wherein a user of an AR technology may view a real-world park-like environment 20 featuring various people, trees, buildings, and a platform 30. Additionally, the user of the AR technology may view a giant robot 40 (e.g., a virtual object) standing upon a real-world platform 30, and a cartoon-like avatar character 50 (e.g., a virtual object) flying by which seems to be a personification of a bumble bee, even though the robot 40 and bumble bee 50 do not actually exist in the real world.

Figure 2:
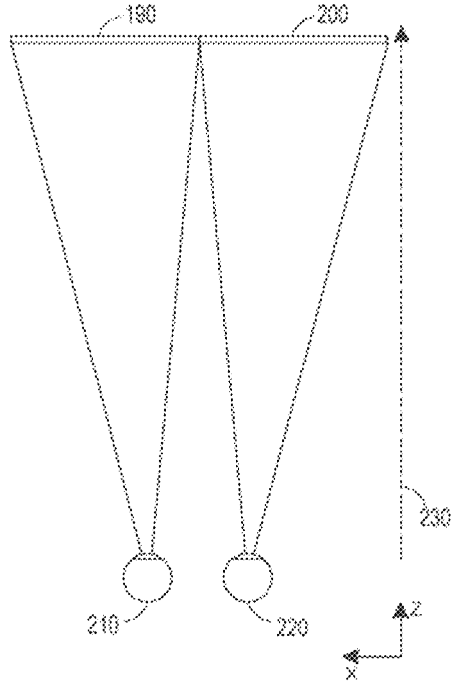
FIG. 2 illustrates an example display system for simulating three-dimensional imagery for a user.

FIG. 2 illustrates an example display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Display systems may simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
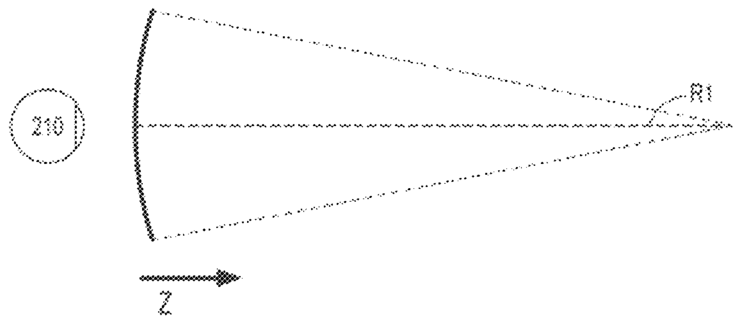
FIGS. 3A-3C illustrate relationships between radius of curvature and focal radius.
Figure 3B:
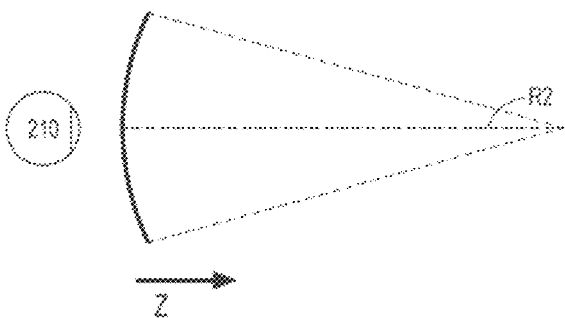
Figure 3C:
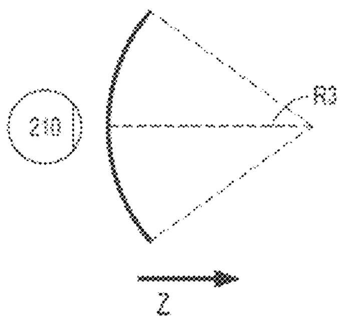

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it will be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
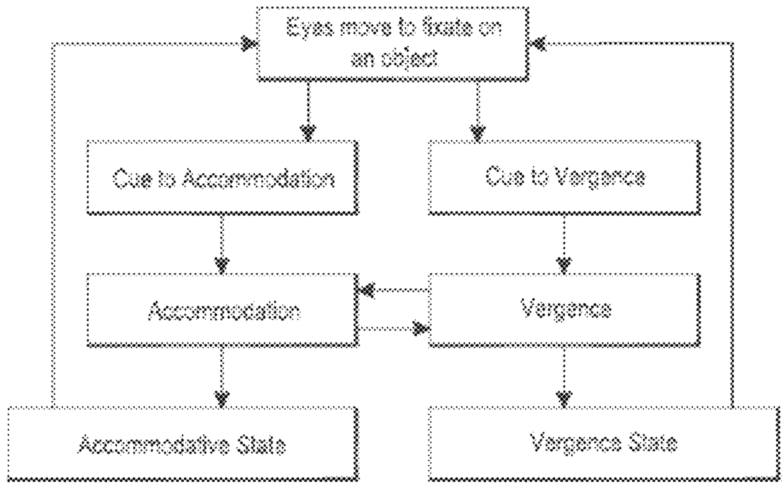
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
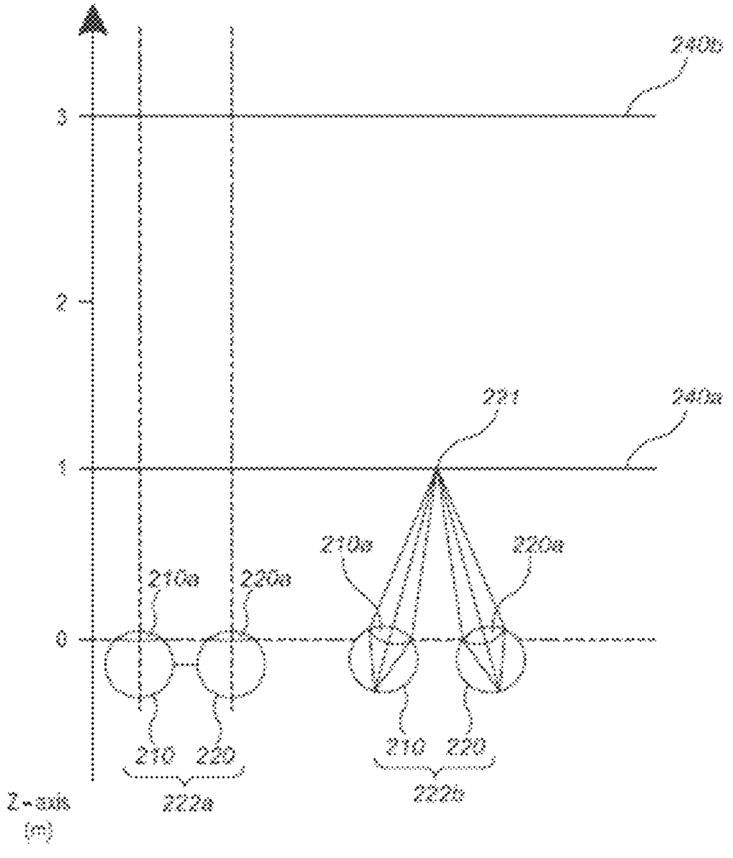
FIG. 4B illustrates examples of different accommodative states and vergence states of a pair of eyes of the user.

With reference now to FIG. 4B, examples of different accommodative and vergence states of the eyes are illustrated. The pair of eyes **222*a* is fixated on an object at optical infinity, while the pair eyes 222*b* are fixated on an object 221 at less than optical infinity. Notably, the vergence states of each pair of eyes is different, with the pair of eyes 222*a* directed straight ahead, while the pair of eyes 222*b* converge on the object 221. The accommodative states of the eyes forming each pair of eyes 222*a* and 222*b* are also different, as represented by the different shapes of the lenses 210*a*, 220*a***.

Undesirably, many users of "3D" display systems find such systems to be uncomfortable or may not perceive a sense of depth at all due to a mismatch between accommodative and vergence states in these displays. As noted above, many stereoscopic or "3D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
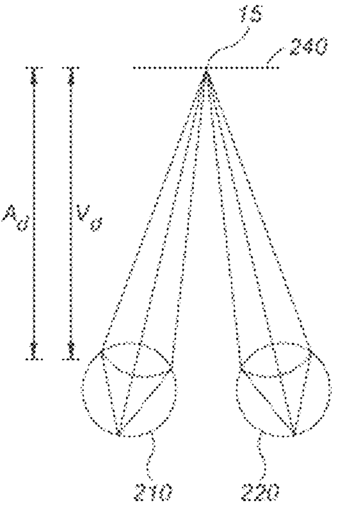
FIG. 4C illustrates an example of a representation of a top-down view of a user viewing content via a display system.
Figure 4D:
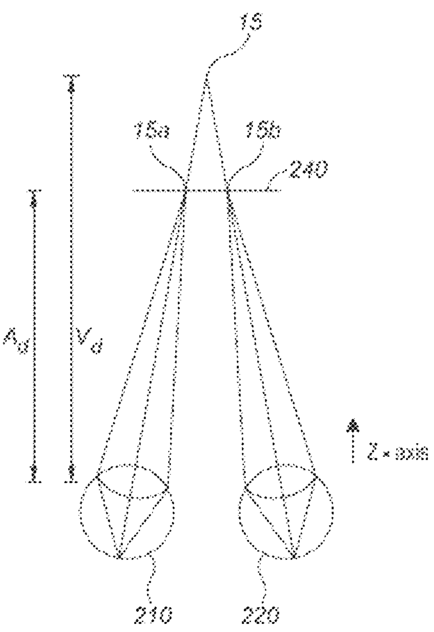
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, Ad. Similarly, there are particular vergence distances, Vd, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15*a*, 15*b* on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., Vd-Ad) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
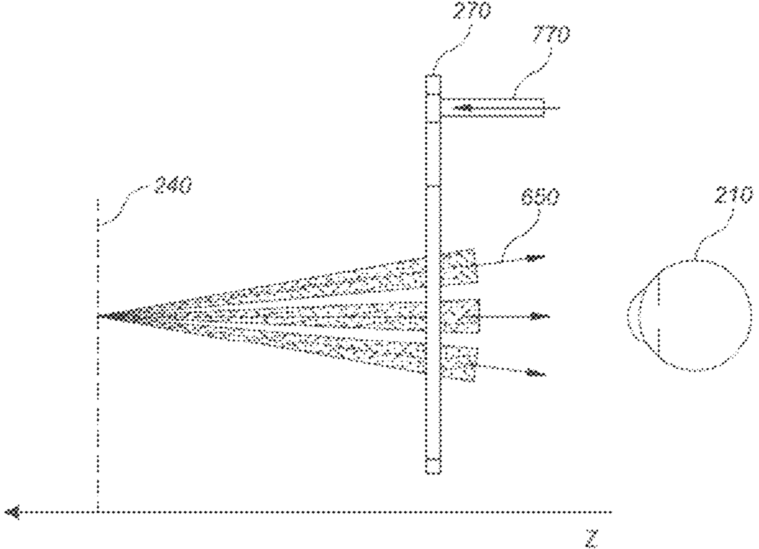
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
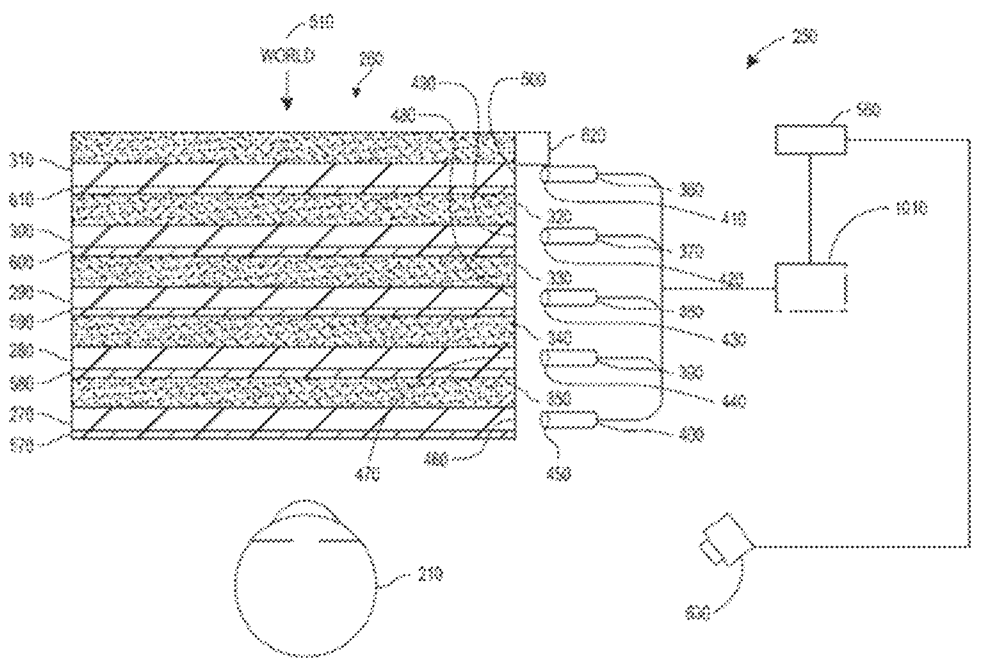
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is encoded with image information and provided by a light projector system 1010, as discussed further herein. In some embodiments, the light projector system 1010 may comprise one or more emissive pixel arrays. It will be appreciated that the emissive pixel arrays may each comprise a plurality of light-emitting pixels, which may be configured to emit light of varying intensities and colors. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the pixel array of the light projector system 1010 and the image may be the image on the depth plane.

A controller 560 controls the operation of one or more of the stacked waveguide assembly 260, including operation of the image injection devices 360, 370, 380, 390, 400, the light projection system 1010. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
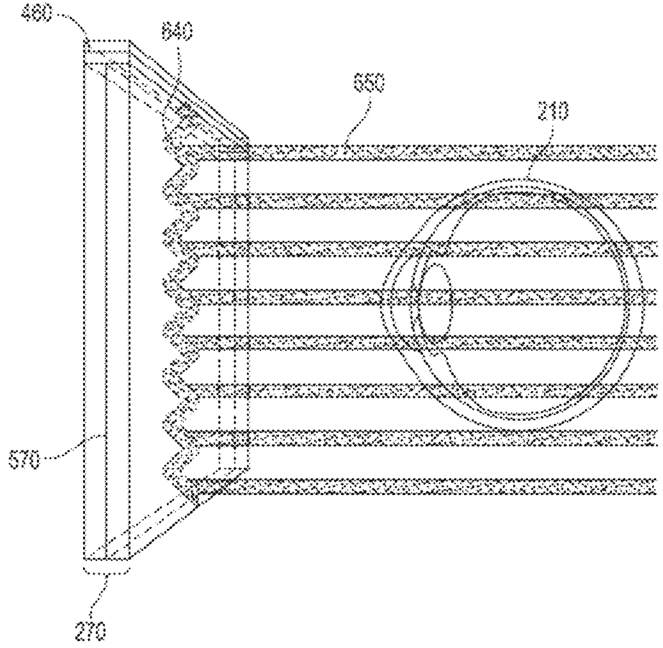
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
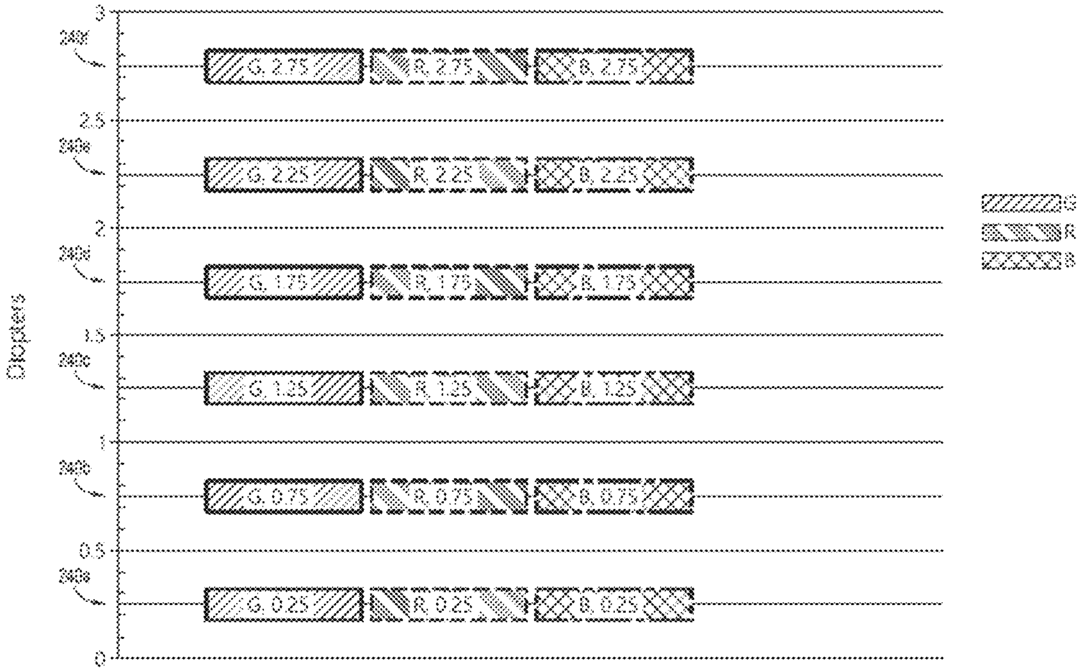
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the FIGS. including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light projection system 1010 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
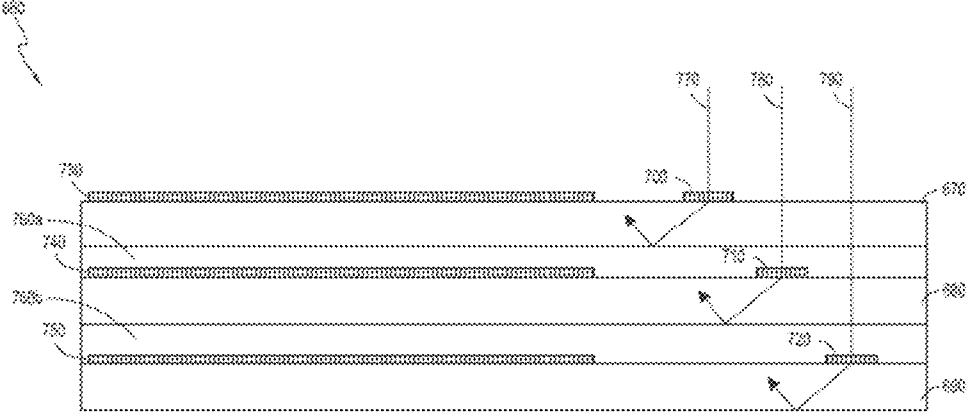
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 are intended for different waveguides (e.g., waveguides configured to output light with different amounts of wavefront divergence, and/or configured to output light having different properties, such as different wavelengths or colors). Thus, in some embodiments, the light rays 770, 780, 790 may have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
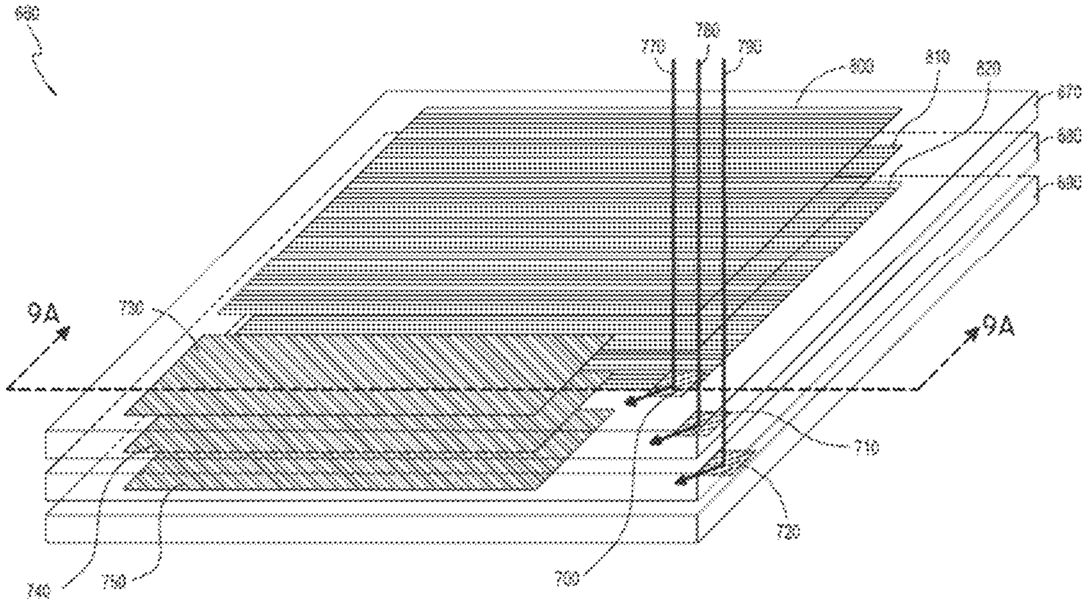
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
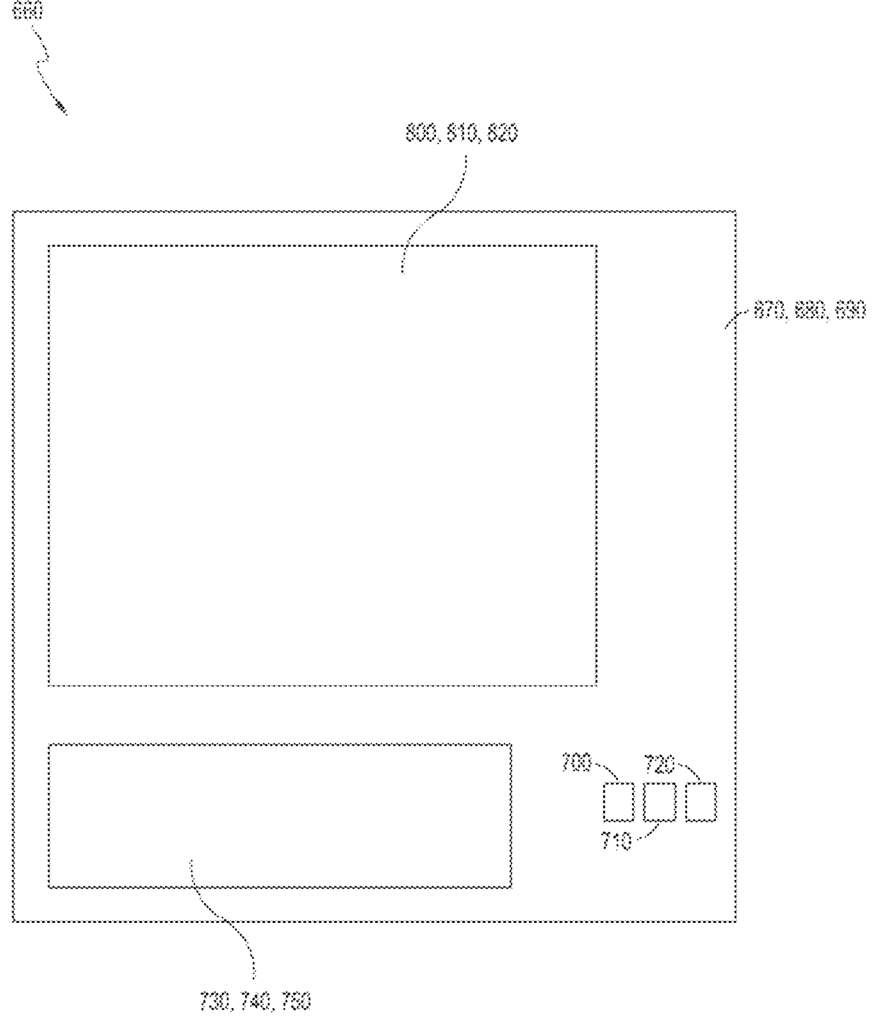
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this non-overlapping spatial arrangement facilitates the injection of light from different resources into different waveguides on a one-to-one basis, thereby allowing a specific light source to be uniquely coupled to a specific waveguide. In some embodiments, arrangements including non-overlapping spatially separated in-coupling optical elements may be referred to as a shifted pupil system, and the in-coupling optical elements within these arrangements may correspond to sub pupils.

Figure 9D:
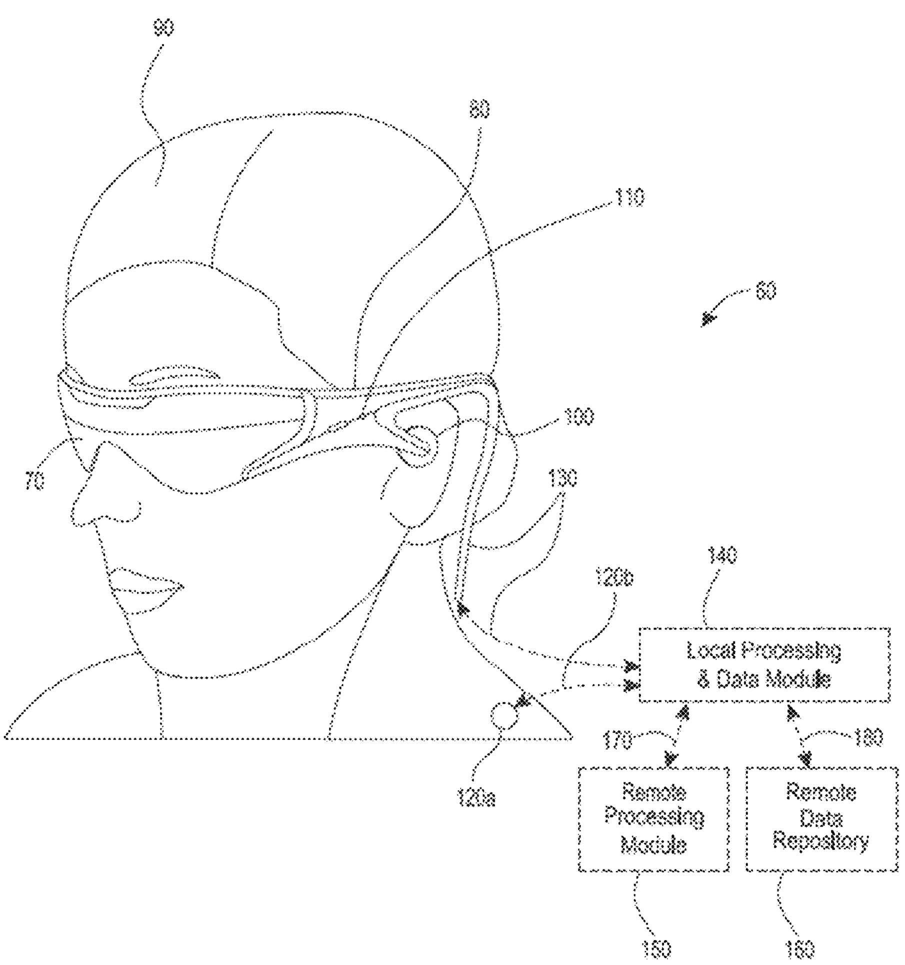
FIG. 9D illustrates an example of wearable display system.
Figure 21:
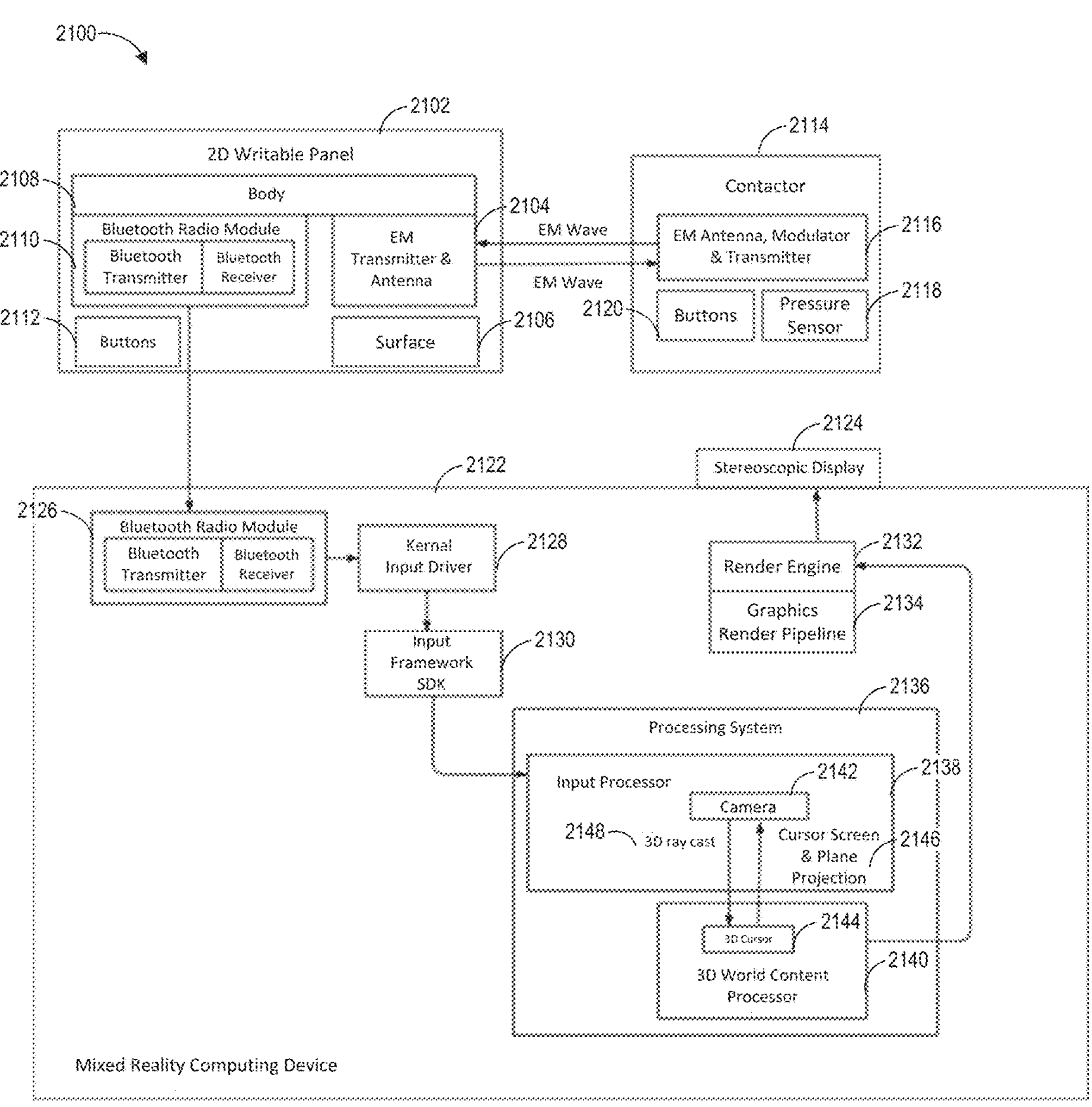
FIG. 21 illustrates a block diagram of an example system for converting a two-dimensional positional input into a three-dimensional point in space.

FIG. 9D illustrates an example of wearable display system 60 into which the various waveguides and related systems disclosed herein may be integrated. In some embodiments, the wearable system 60 is the system 250 of FIG. 6, with FIG. 6 schematically showing some parts of that system 60 in greater detail. For example, the waveguide assembly 260 of FIG. 6 may be part of the display 70. In some embodiments, the wearable display system 60 is the system 2122 with stereoscopic display 2124 of FIG. 21, with FIG. 21 schematically showing some parts of that system 2122 in greater detail.

With continued reference to FIG. 9D, the wearable system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user 90 to provide stereo/shapeable sound control). The wearable system 60 may also include one or more microphones 110 or other devices to detect sound. In some embodiments, the microphone is configured to allow the user 90 to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing a physiological state of the user 90 in some embodiments. For example, the sensor 120*a* may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user 90, embedded in headphones, or otherwise removable attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Examples of User Inputs

Figure 10A:
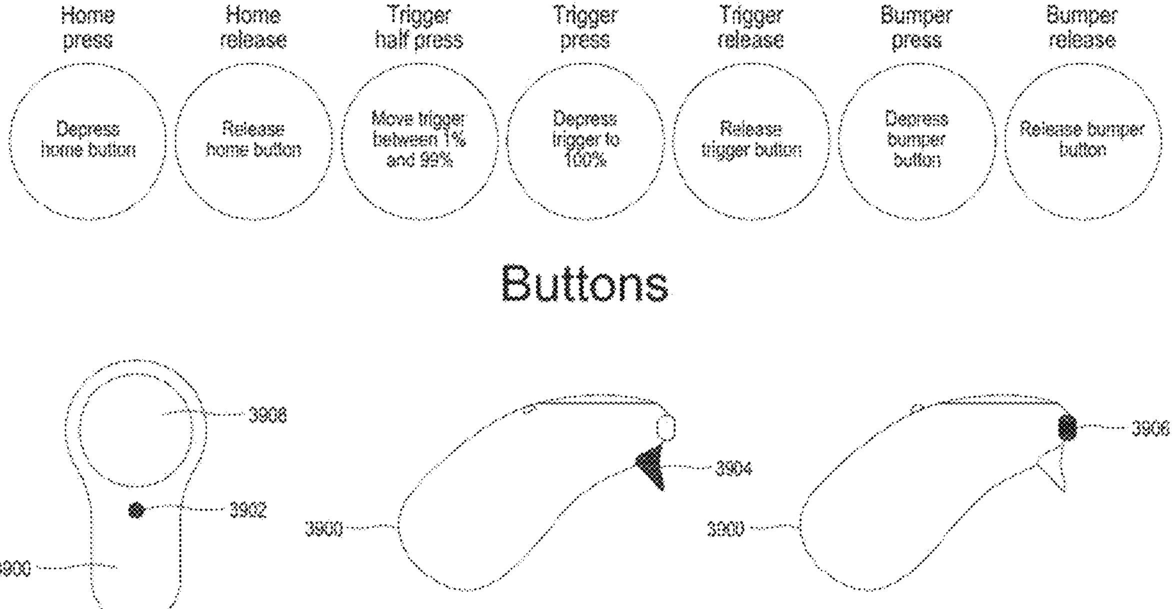
FIG. 10A illustrates examples of user inputs received through controller buttons.
Figure 10B:
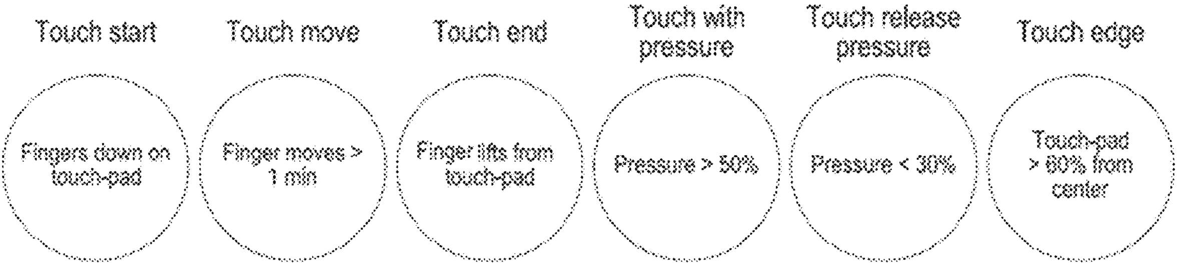
FIG. 10B illustrates examples of user inputs received through a controller touchpad.
Figure 10B:
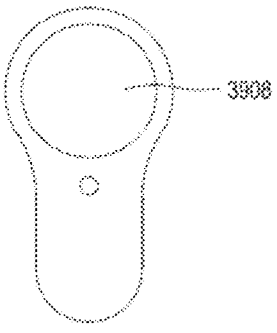

FIGS. 10A and 10B illustrate examples of user inputs received through controller buttons or input regions on a user input device. In particular, FIGS. 10A and 10B illustrates that a controller 3900, which may be a part of the wearable system disclosed herein and which may include a home button 3902, trigger 3904, bumper 3906, and touchpad 3908. The user input device 466 or a totem can serve as controller(s) 3900 in various embodiments of wearable systems 60.

Potential user inputs that can be received through controller 3900 include, but are not limited to, pressing and releasing the home button 3902; half and full (and other partial) pressing of the trigger 3904; releasing the trigger 3904; pressing and releasing the bumper 3906; touching, moving while touching, releasing a touch, increasing or decreasing pressure on a touch, touching a specific portion such as an edge of the touchpad 3908, or making a gesture on the touchpad 3908 (e.g., by drawing a shape with the thumb).

Figures 10C, 10D:
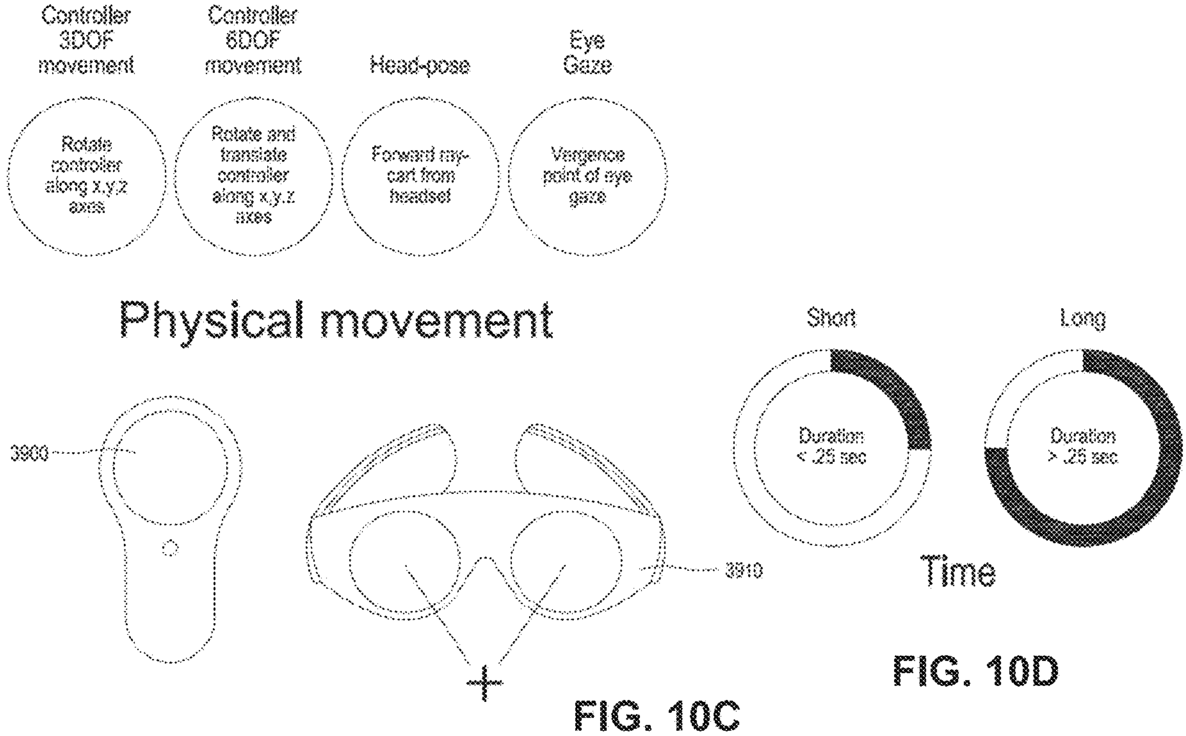
FIG. 10C illustrates examples of user inputs received through physical movement of a controller or a head-mounted device.
FIG. 10D illustrates examples of how user inputs may have different durations.

FIG. 10C illustrates examples of user inputs received through physical movement of a controller or a head-mounted device. As shown in FIGS. 10C, physical movement of controller 3900 and of a head mounted display 3910 (HMD) may form user inputs into the system. The HMD 3910 may comprise the head-worn components 70, 80, 100, 110 of the wearable display system 60 shown in FIG. 9D. In some embodiments, the controller 3900 provides three degree-of-freedom (3 DOF) input, by recognizing rotation of controller 3900 in any direction. In other embodiments, the controller 3900 provides six degree-of-freedom (6 DOF) input, by also recognizing translation of the controller in any direction. In still other embodiments, the controller 3900 may provide less than 6 DOF or less than 3 DOF input. Similarly, the HMD 3910 may recognize and receive 3 DOF, 6 DOF, less than 6 DOF, or less than 3 DOF input.

FIG. 10D illustrates examples of how user inputs may have different durations. As shown in FIG. 10D, certain user inputs may have a short duration (e.g., a duration of less than a fraction of a second, such as 0.25 seconds) or may have a long duration (e.g., a duration of more than a fraction of a second, such as more than 0.25 seconds). In at least some embodiments, the duration of an input may itself be recognized and utilized by the system as an input. Short and long duration inputs can be treated differently by the wearable system 60. For example, a short duration input may represent selection of an object, whereas a long duration input may represent activation of the object (e.g., causing execution of an app associated with the object).

FIGS. 10A-10D are discussed in detail as example user inputs of the system, however these embodiments may not be the most optimal user input device for the system as described herein. The controller 3900 may include a touchpad 3908 which may be used as a two-dimensional positional input which can be used to determine a three-dimensional point in space. However, the touchpad 3908 uses human touch and/or gestures to determine the two-dimensional positional input which may be less precise, accurate, consistent, ergonomic and/or reliable compared to other embodiments described herein such as FIG. 10E. For example, writing handwritten notes in three-dimensional space based on the two-dimensional input of the controller 3900 via the touchpad 3908 may prove difficult and/or illegible due to the imprecision of the human touch and/or gestures from the touchpad 3908.

Figure 10E:
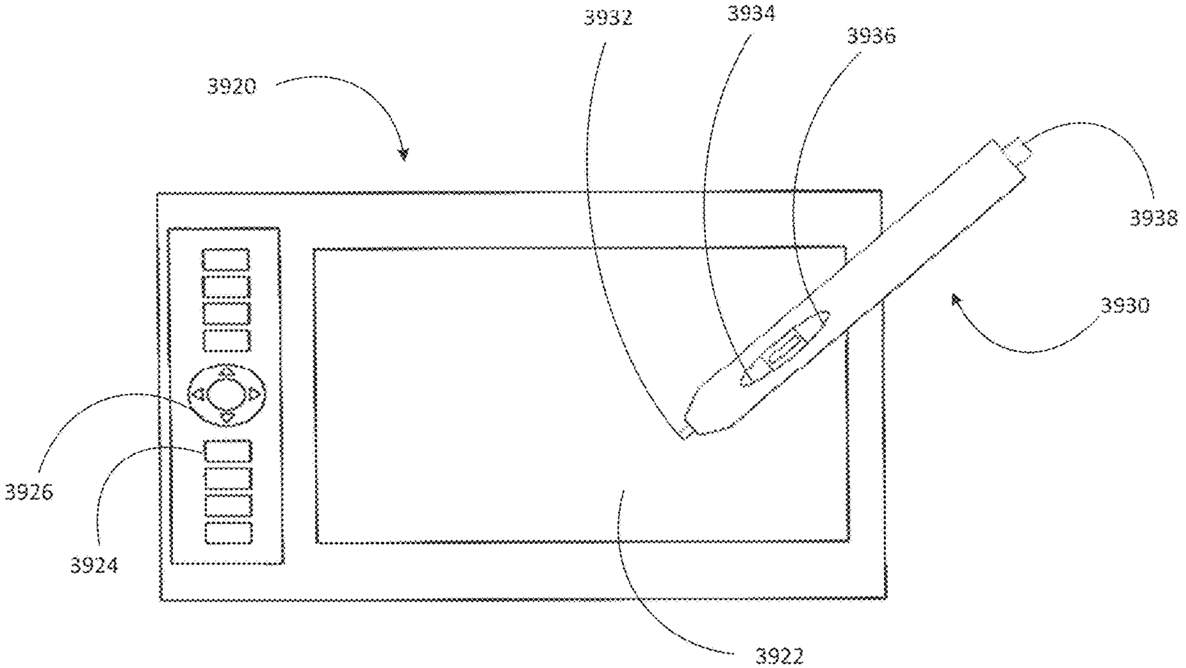
FIG. 10E illustrates an example user input pointing device via a two-dimensional writable panel and contactor.

FIG. 10E illustrates an example user input device which may be two degree of freedom (2 DOF) e.g., XY, three degree of freedom (3 DOF) e.g., XYP or XYD wherein P is pressure and D is range, or four degree of freedom (4 DOF) e.g., XYPD, user input device which may include a two-dimensional writable panel 3920 e.g., tablet, smartphone, pen display, or other like two-dimensional writable panel and a contactor 3930 e.g., stylus, pen, electronic pen, finger, or other like two-dimensional writable panel contact device. Other user input device embodiments that may be used in the system may include a mouse such as an ergonomic mouse with associated surface, and a trackball or rollerball. The two-dimensional writable panel 3920 may include multiple, in some embodiments customizable, buttons such as user input buttons 3924 and directional buttons 3926. The two-dimensional writable panel may further include a touch screen and/or surface 3922 which may be resistive, capacitive, surface acoustic wave, optical, electromagnetic, or any other suitable technology. The two-dimensional writable panel 3920 may also include wireless connectivity which may include WiFi, Bluetooth, or Electromagnetic (EM) Wave. The two-dimensional writable panel 3920 may include an active region on the two-dimensional writable panel surface 3922 in which the contactor 3930 may be active and/or engaged with. The active region is the area on the two-dimensional writable panel surface 3922 that the user 90 may interact with by contactor 3930 such that a response is received by the two-dimensional writable panel 3920. The active region may be indicated by a different color and/or by a pattern. For example, the edges of the active region may be outlined or indicated with marks in the corners of the active region.

The contactor 3930 may be passive, capacitive, Bluetooth, or electronic pen e.g., a digitizer. The contactor 3930 may include multiple customizable buttons and may be positioned on the side 3934, 3936 and/or on top 3938 of the contactor 3930. In some embodiments, the contactor 3930 may include a tip 3932 with a pressure sensor to detect and transmit levels of pressure sensitivity. The contactor 3930 is detected by the two-dimensional writable panel 3920 and produces input data when positioned within a range (D), e.g., a distance of one inch or less over the two dimensional writable panel surface 3922. When the contactor 3930 is more than the distance D (e.g., one inch) above the two-dimensional writable panel surface 3922, the two-dimensional writable panel 3920 can no longer communicate with the contactor 3930 and event data stops.

In some embodiments, a device driver 2128 (FIG. 12), may be used to communicate between the wearable system 60 and the two-dimensional writable panel 3920. For example, two input events streams may be provided by the device driver: XY position and tip-pressure (P). The two input event streams may establish the contactor states, such as:

1. If tip pressure P>0 then contactor 3930 may be in contact with two-dimensional writable panel surface 3922,
2. If receiving XY events but zero pressure (e.g., P=0) then contactor 3930, may be hovering in range over two-dimensional writable panel surface 3922, and
3. If XY events stop streaming then contactor 3930 may be out of range (D).

In embodiments that may include the active region on the two-dimensional writable panel 3920, the aspect ratio of the two-dimensional writable panel's 3920 active area may need to be determined by an initial query of the two-dimensional writable panel's 3920 maximum X and Y values.]

FIGS. 11A, 11B, 10A and 10B illustrate various examples of user inputs that may be received and recognized by the system. The user inputs may be received over one or more modes of user input (individually, or in combination, as illustrated). The user inputs may include inputs through controller buttons such as home button 3902, trigger 3904, bumper 3906, and touchpad 3908; physical movement of controller 3900 or HMD 3910; eye gaze direction; head pose direction; gestures; voice inputs; etc.

Figure 11A:
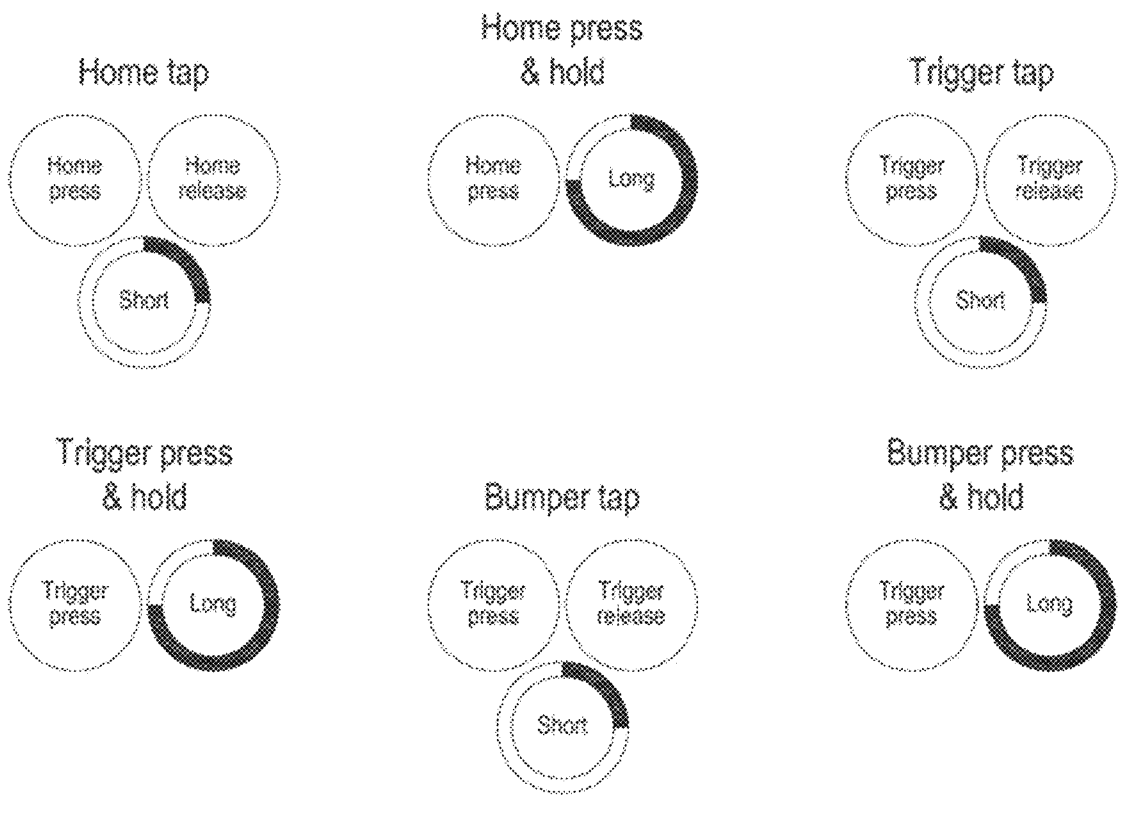
FIG. 11A illustrates additional examples of user inputs received through controller buttons.

As shown in FIGS. 10A and 11A, a short press and release of the home button 3902 may indicate a home tap action, whereas a long press of the home button 3902 may indicate a home press & hold action. Similarly, a short press and release of the trigger 3904 or bumper 3906 may indicate a trigger tap action or a bumper tap action, respectively; while a long press of the trigger 3904 or bumper 3906 may indicate a trigger press & hold action or a bumper press & hold action, respectively.

Figure 11B:
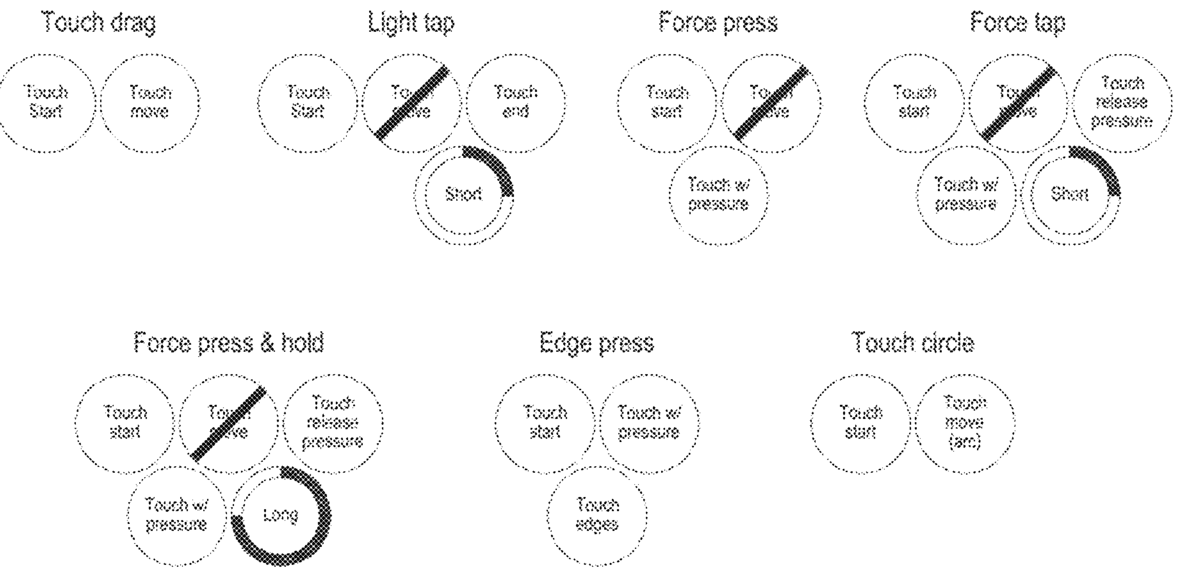
FIG. 11B illustrates additional examples of user inputs received through a controller touchpad.

As shown in FIGS. 10B and 11B, a touch of the touchpad 3908 that moves over the touchpad may indicate a touch drag action. A short touch and release of the touchpad 3908, where the touch doesn't move substantially, may indicate a light tap action. If such a short touch and release of touchpad 3908 is done with more than some threshold level of force (which may be a predetermined threshold, a dynamically determined threshold, a learned threshold, or some combination thereof), the input may indicate a force tap input. A touch of the touchpad 3908 with more than the threshold level of force may indicate a force press action, while a long touch with such force may indicate a force press and hold input. A touch near the edge of the touchpad 3908 may indicate an edge press action. In some embodiments, an edge press action may also involve an edge touch of more than a threshold level of pressure. FIG. 10B also shows that a touch on touchpad 3908 that moves in an arc may indicate a touch circle action.

Example Display of Mesh from System

Figure 12:
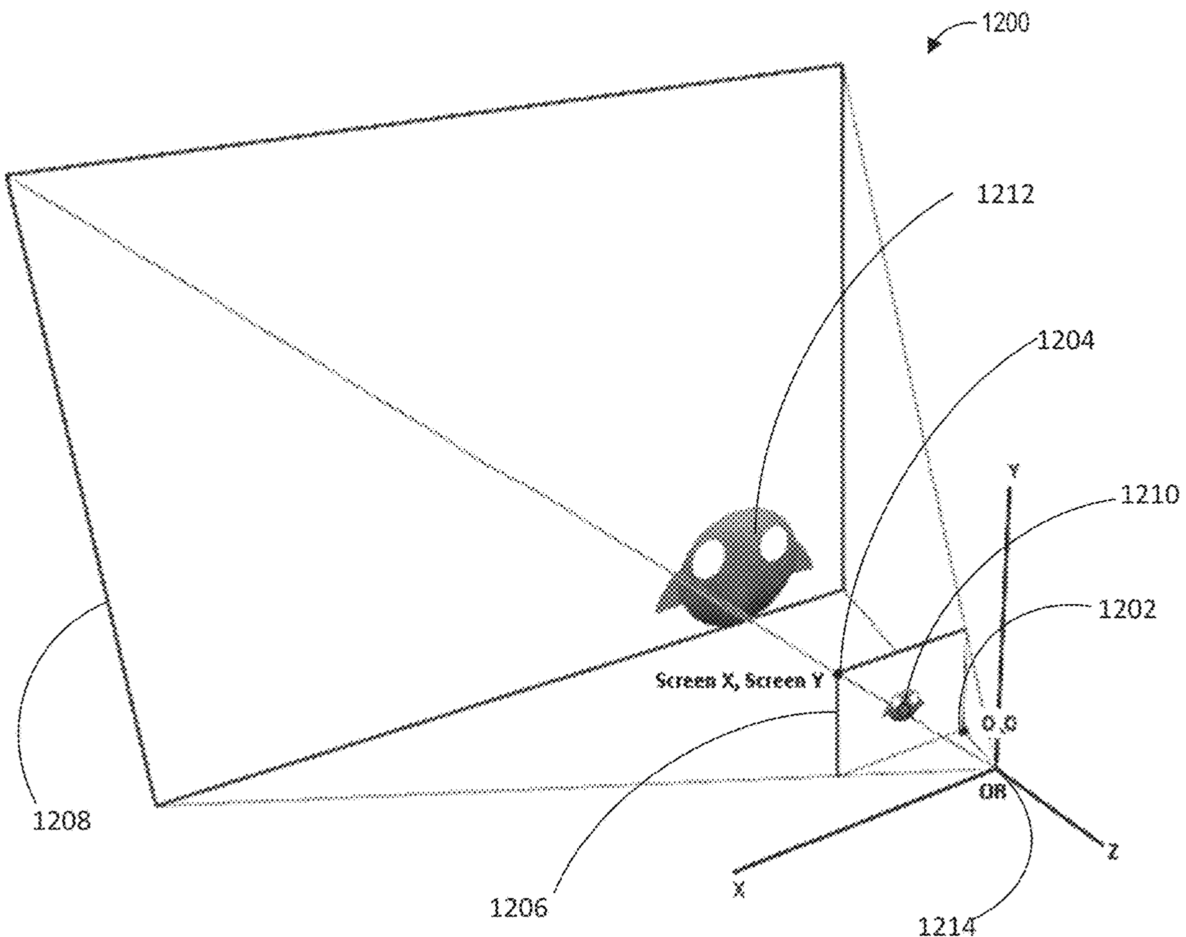
FIG. 12 illustrates a perspective view of an example of a virtual object projected on a cursor screen and a mesh rendered in front of a cursor plane.

FIG. 12 illustrates a perspective view 1200 of an example of a virtual object 1210 projected on a cursor screen 1206 and a mesh 1212 of a virtual object (e.g., a Magic Leap logo in this example) rendered in front of a cursor plane 1208. The virtual object 1210 on the cursor screen 1206 may be or include a cursor, point, line or other virtual object or indicator. The virtual object 1210 on the cursor screen 1206 will be referred to herein as a cursor 1210 to provide a consistent exemplary term; however, the use of the term cursor 1210 herein should not be limited and should include the full definition and scope of the virtual object 1210 on the cursor screen 1206.

In some embodiments, virtual object 1212 may comprise mesh, and thus may include a collection of edges, vertices, and faces. The mesh 1212 may encompass real world objects, virtual objects, or mixed objects comprised of real and virtual objects, creating a meshed environment viewable to the user 90 in a VR, AR, or MR session. Edges may be connections between two vertices. Vertices may be positions in three-dimensional space represented by a series of points. Faces may be a closed set of edges in which the face may contain triangles (three edges), quadrilaterals (four edges), or other simple convex polygons (n-edges). An example mesh 1212, e.g., the magic leap logo, can be seen in FIG. 12. Further, the user 90 may view a grid or set of gridlines associated with the meshed environment in a VR, AR or MR session.

The cursor screen 1206 may be a virtual screen, e.g., a virtual plane in a VR, AR, or MR session. The cursor screen 1206 may be positioned at or near a clipping plane of a camera's viewing frustum (e.g., the three-dimensional region that is imaged by the camera). In some embodiments, the camera may be a virtual camera, which may be placed in a VR, AR, or MR session. In some embodiments, the origin of the virtual camera (or simply "camera" in some uses herein) may be the same as a head pose origin. In an example embodiment the cursor screen 1206 may be positioned at the near clipping plane at a default 0.37 meters from the start of the camera's viewing frustum 1214 e.g., "OR" or the head pose origin. In other embodiments, the cursor screen 1206 may be positioned at other distances from the wearable headset, such as 0.2, 0.5, 0.75, 1.0, or 2.0 m, for example.

The cursor position may be rendered at a fixed size, measured in pixels, within the display field of view (FOV). The cursor 1210 may be displayed on the wearable device and may be defined by its two-dimensional position, e.g., XY on the cursor screen 1206. The cursor screen 1206 may be further defined as the rectangular region at or by the near clipping plane of a cameras viewing frustum, measured in pixels that correspond to the physical resolution of the display device. Cursor position is tracked on the cursor screen 1206 in two-dimensional coordinates e.g., XY. User input and other factors such as head position movement, may modify the cursor's 1210 present position in two-dimensional coordinates on the cursor screen 1206. In some embodiments, cursor location may be tracked within a second duplicate camera which may or may not have the same pose e.g., position and rotation as the main camera.

The cursor plane 1208 is a virtual second plane positioned behind the cursor screen 1206 (e.g., further away from the wearable system), at a defined maximum depth e.g., Z position. In an example embodiment, the cursor plane 1208 may be positioned at a default one meter depth from the start of the camera's viewing frustum 1214. The cursor plane 1208 may be adjusted or fixed. In an example embodiment the cursor plane 1208 may be adjusted or fixed by a user input device such as the user inputs described herein, e.g., using a two-dimensional writable panel 3920, contactor 3930, or one or more customizable user input buttons configured to move or fix the depth of the cursor plane 1208 relative to the start of the camera's viewing frustum 1214.

Depending on the implementation, coordinates discussed herein (e.g., X, Y, Z) may be absolute or relative. Absolute may refer to a direct mapping of user input device, e.g., contactor coordinates, to cursor screen 1206 coordinates. For example, if a user 90 brings the contactor 3930 into range in the lower left corner of the two-dimensional writable panel 3920, the cursor XY position may be immediately set to 0,0. Relative may differ from absolute in that instead of setting the coordinates directly to the contactor XY position, relative mapping may measure the contactor delta position. Further, updating the cursor position may be achieved when the delta position is added to the last known cursor position.

Overview of 2D to 3D Mapping

Provided below are examples systems and methods that allow a two-dimensional writable panel 3920 and contactor 3930 to be used to control a three-dimensional e.g., XYZ, cursor 1210. A cursor initialization may be part of a startup process, such as is discussed with reference to FIG. 14. The startup process generally determines a 3D position of a cursor that may be used to point, annotate, or draw on objects in the AR environment. FIGS. 15A and 15B illustrate an example 22 interactive process (e.g., the actual pointing, annotating, or drawing on objects in the AR environment using a 2D input device) that may be performed after startup.

Example of Cursor Initialization

Figure 13:
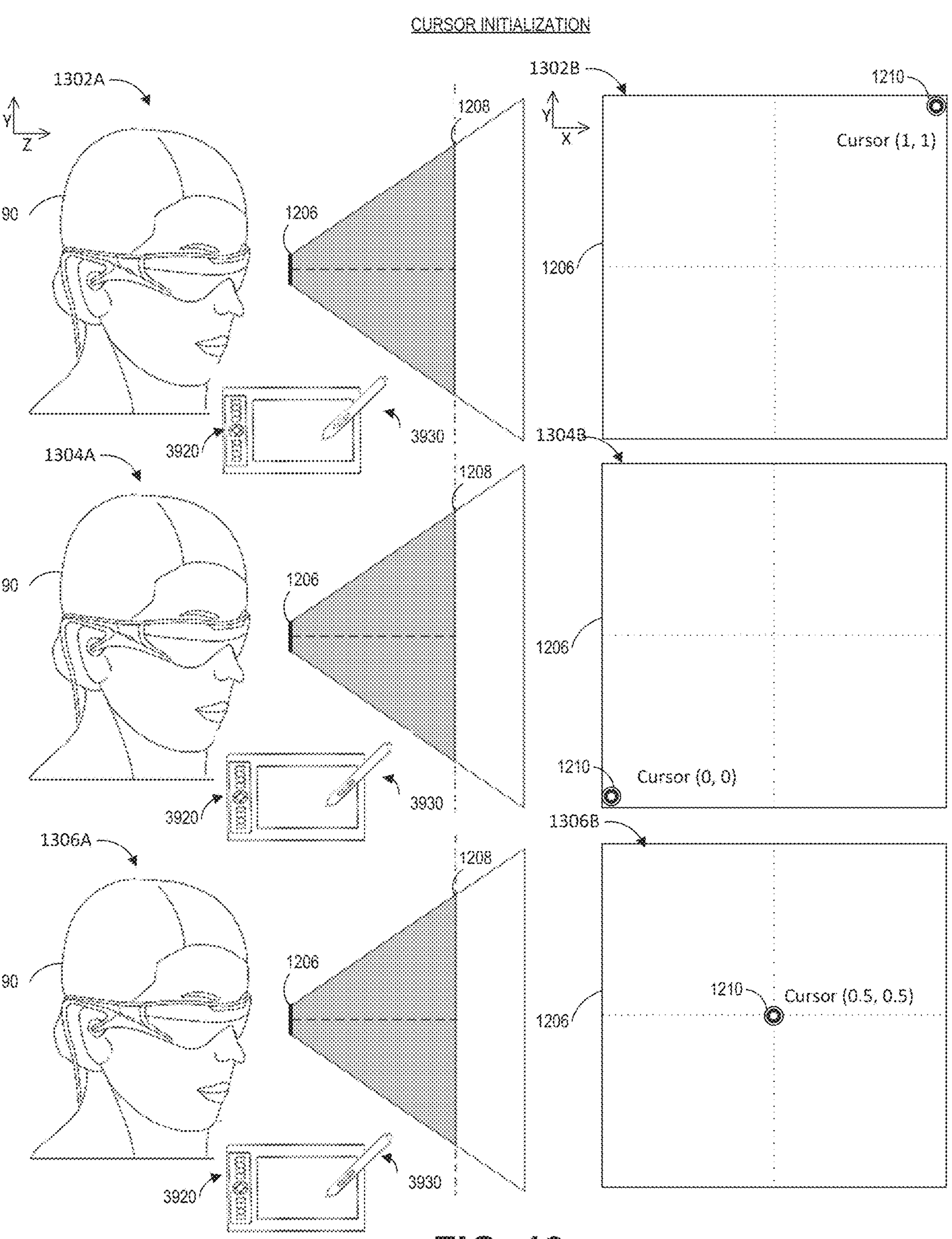
FIG. 13 illustrates examples of a user initializing a cursor in response to a user input device.

FIG. 13 illustrates examples of a user 90 initializing a cursor 1210 in response to a user input device e.g., a two-dimensional writable panel 3920 and contactor 3930. A cursor screen 1206 as illustrated in FIG. 12 may be of screen dimensions [0,0] (e.g., point 1202 of FIG. 12) to [Screen X, Screen Y] (e.g., point 1204 of FIG. 12), wherein Screen X and Screen Y may represent the maximum screen resolution of the cursor screen 1206. In an example embodiment the cursor screen 1206 dimension may span from [0,0] to [1280,720]. As illustrated in FIGS. 13 and 15A-B, in another embodiment the cursor screen 1206 may be represented by homogeneous screen coordinates e.g., projective coordinates as a way of representing the two-dimensional cursor screen 1206 dimensions as projected transformed coordinates. The cursor screen 1206 may connect to a render engine which may further comprise a graphics render pipeline such that the cursor screen 1206 dimensions may be represented by homogeneous screen coordinates. In the homogeneous coordinate system embodiment the cursor screen 1206 may span from (0,0) to (1,1).

The cursor initialization may occur through an initialization state and/or may occur in response to receiving a user input indicating a cursor initialization reset. For example, cursor initialization may be initiated by the user pressing one of the customizable buttons of the two-dimensional writable panel 3920, contactor 3930, or other user input device as described herein. The cursor initialization may reset the cursor position to a pre-defined position. As seen in FIG. 13, three examples of cursor initialization are illustrated as examples 1302A, 1304A, and 1306A. As shown, the cursor 1210 may be initiated at different locations on the cursor screen, such as at location (0,0) in example cursor screen 1304B, at (0.5,0.5) in the example cursor screen 1306B, and at location (1,1) in example cursor screen 1302B. In other examples, other coordinate systems for a cursor screen may be used and/or other initialization coordinates may be defined. In the three illustrated examples, the user 90 is shown with the same initial head pose, which does not impact the initial cursor position in this example. In other examples, head pose of the user may be considered in determining an initialization point on the cursor screen.

Example Startup Process

Figure 14:
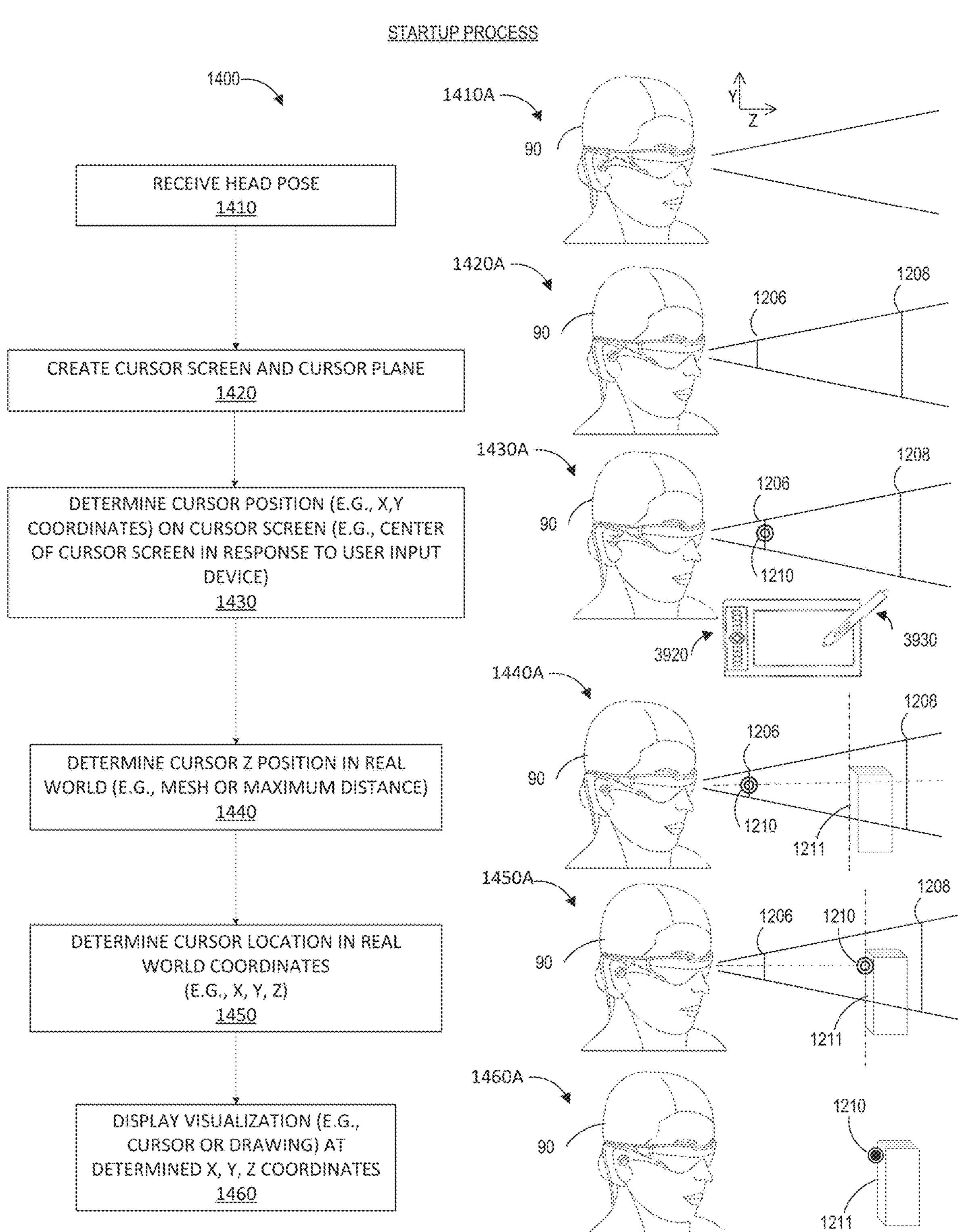
FIG. 14 illustrates a flowchart of an example startup process with a perspective view for each step.
Figure 15A:
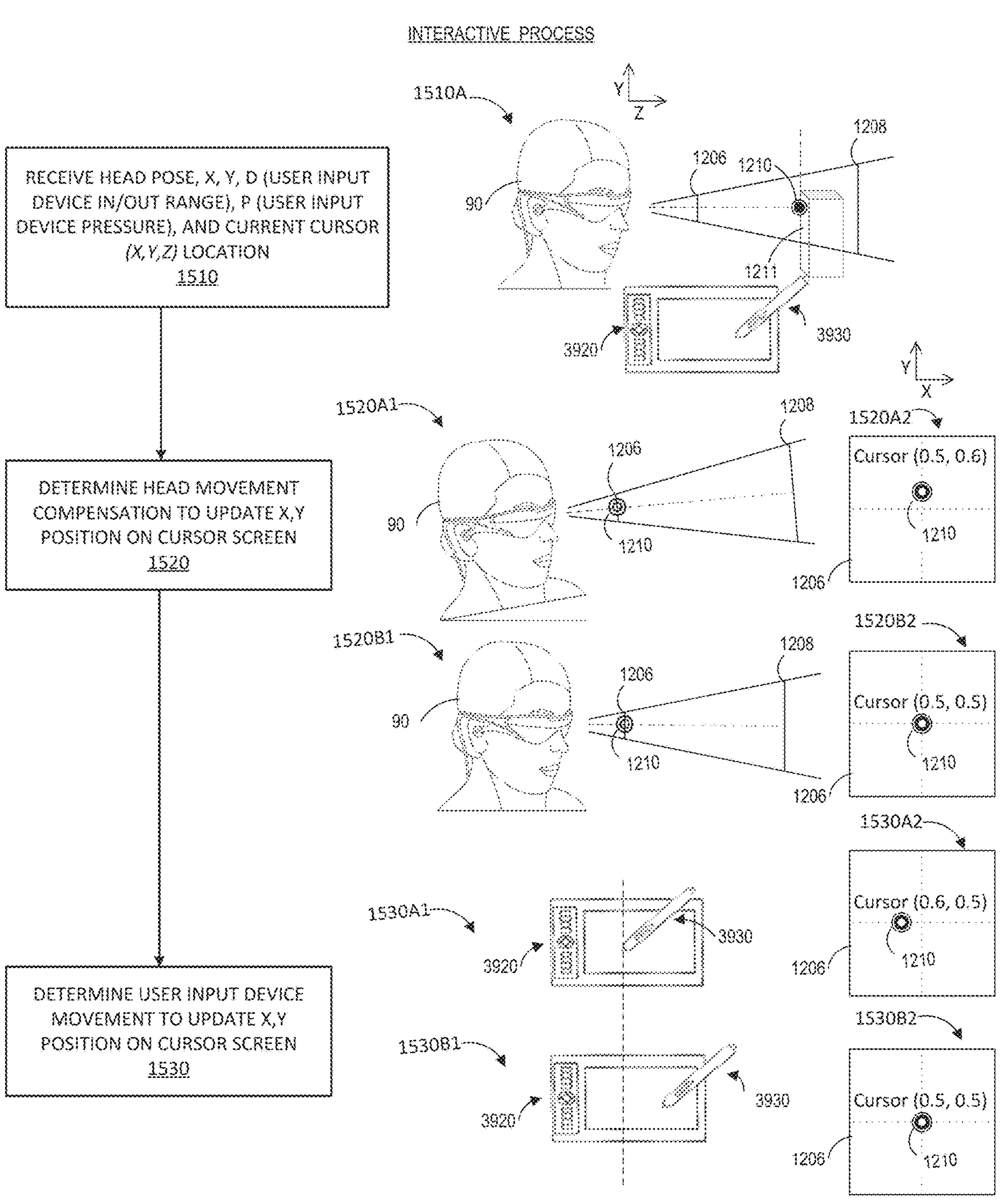
FIG. 15A illustrates a flowchart of an example interactive process, specifically determining head and user input device movement, with a perspective view for each step.
Figure 15B:
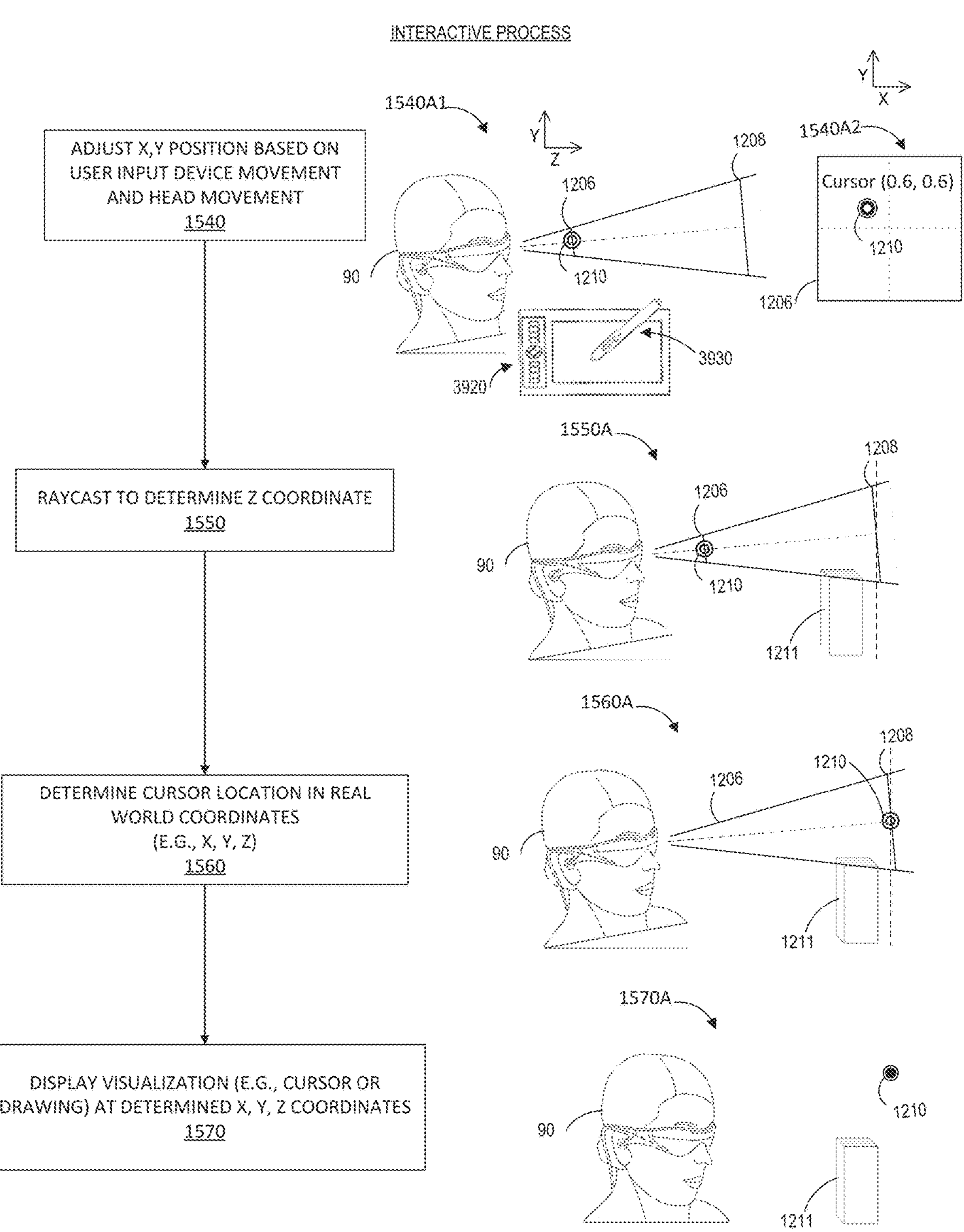
FIG. 15B further illustrates a flowchart of the example interactive process, specifically displaying a visualization based on the determined real world cursor location, with a perspective view for each step.

FIG. 14 illustrates a flowchart 1400 of an example startup process according to one embodiment. FIG. 14 further illustrates several perspective views of a user 90 engaging in the startup process at various stages of the process. The startup process of the system may begin at block 1410 by receiving an initial head pose of the user 90, which is shown in view 1410A by a frustum extending from the wearable system. The head pose may define a relationship between objects in the real world and the camera and may include position and rotation of the wearable headset. The head pose of the wearable headset may initially be determined by a position and a rotation with reference to a defined origin point 1214 (e.g., FIG. 12). In some embodiments, the origin point 1214 (e.g., FIG. 12) may be first defined by the position of a centered point between the two lenses of the HMD e.g., the point between the user's eyes on the wearable headset which may define an origin for a camera frustum and may further be defined by the initial rotation of the camera.

Moving to block 1410, with a head pose determined, as shown in view 1420A, a cursor screen 1206 e.g., a virtual screen or plane, may be created at a predefined distance from the head pose origin point 1214 (e.g., FIG. 12) as well as a cursor plane 1208 e.g., a virtual plane, positioned behind the cursor screen 1206 at a second predefined distance from the head pose origin point 1214. In some embodiments, the cursor screen 1206 may begin at a near clipping plane of the camera frustum and the cursor plane 1208 may be defined at the end of the camera frustum. In some embodiments, the clipping plane of the camera frustum may be at the same Z distance from the user as the HMD clipping plane.

Next, at block 1430 a cursor position on the cursor screen 1206 is determined, such as with a cursor initialization process discussed above with reference to FIG. 13. In the example of FIG. 14, and as shown in view 1430A, the cursor position is determined in two-dimensions e.g., at an XY position, on the cursor screen 1206. In some embodiments, a user input, e.g., a button press, may trigger cursor initialization and/or may set the cursor position at a defined position on the cursor screen 1206 ranging from 0 to 1. In some embodiments, the defined position on the cursor screen 1206 may be defaulted to (0.5,0.5) e.g., the center of the cursor screen 1206.

Moving to block 1440, a one-dimensional cursor position, e.g., a Z position, is determined. In this example, the Z cursor position is determined by ray casting out from the two-dimension (e.g., XY) cursor position of the cursor screen 1206 into the real world (e.g., into a digital copy of the real world that is in or can be transformed into real world coordinates). Ray casting may include ray tracing in which one or more rays (e.g. a straight line between two points) may be traced from a view frustum origin through the cursor position on the cursor screen 1206 to find the closest object that may be blocking the path of that ray. The ray cast may hit a mesh 1212 (e.g., a real world object, a virtual object, or a mixed real and virtual object) or the cursor plane 1208. In view 1440A, a mesh 1211 that describes a virtual 3D object is illustrated. In this example, the one-dimensional cursor position, e.g., Z position, is determined at the position at which the ray cast hits the mesh 1211. If the ray cast does not hit the mesh (e.g., if the virtual object in view 1440A is not present), the Z position will be set at the cursor plane 1208, since in that example, the cursor plane 1208 would be the first mesh to intersect with the ray.

At block 1450, a real world coordinate position of the cursor 1210 is determined by combining the determined two-dimensional (e.g., XY cursor position) from block 1430 and the determined one-dimensional cursor position (e.g., Z position) from block 1440. As shown in view 1450A, the cursor 1210 is positioned on the surface of the virtual object mesh 1211.

At block 1460, a representation of the cursor 1210 may be displayed to the user 90 via the wearable device at the determined three-dimensional coordinates, e.g., XYZ real world cursor position. Thus, view 1460A illustrates a representation of the cursor 1210 on a surface of the 3D virtual object.

Example Interactive Process

FIGS. 15A and 15B illustrate a flowchart of an example interactive process, specifically determining head and user input device movement to display a visualization based on a determined real world cursor location, with a perspective view for each step. The example interactive process may occur after the example startup process, e.g., FIG. 14.

In general, the example interactive process begins at block 1510 by determining or receiving the current head pose and three-dimensional (e.g., XYZ) cursor position. Then, at block 1520, the system back projects the current three-dimensional cursor position to a two-dimensional position on the cursor screen 1206. Then at block 1530 the system checks if the input device contactor 3930 has moved. Continuing on to FIG. 15B, at block 1540 applies any head movement adjustment to the cursor location, and then at block 1550 re-projects the determined cursor position into three-dimensional space e.g., onto a cursor plane 1208 or a mesh 1212 to determine real world coordinate at block 1560 that may then be used at block 1570 to display a visualization at the determined coordinates. This process may be performed in a generally looping pattern to monitor inputs from the user and coordinate interactions within the augmented reality environment. Further detail of these processes is provided below.

Beginning at block 1510, the system receives current interactivity data, including one or more of:

the current head pose of the user, which may include a position and rotation of the wearable device, the current two-dimensional coordinates of the user input device (e.g., current XY coordinates of the contactor 3930 on the two-dimensional panel surface 3922, the user input device pressure (P), e.g., pressure of the contactor 3930 on the two-dimensional panel surface 3922, the user input device in/out of range indication (D) e.g., the distance of the contactor 3930 from the two-dimensional panel surface 3922, and the current three-dimensional e.g., XYZ cursor location. View 1510A illustrates a cursor 1210 at the current cursor location, for example.

Moving to block 1520, a head movement compensation is determined, which may be used to adjust the XY position of the cursor 1210 on the cursor screen 1206 based on the new head pose. To determine the XY position of the cursor 1210 on the cursor screen 1206 based on the new head pose 1520A1, the system may back project the three-dimensional cursor position in real world space onto the cursor screen 1206. The system may back project by measuring the attenuation of the rays cast from the cursor screen 1206 to the three-dimensional cursor position in real world space. In some embodiments, the attenuation may be measured by using the known values of the projection angle (e.g., the change in head pose), and known distance along the projection (e.g., distance from the cursor screen 1206 to the three-dimensional cursor position in real world space). In some embodiments, the cursor 1210 may lock to the three-dimensional real world position (e.g., XYZ), unless the user input device moves the cursor 1210. Thus, when there is head pose movement, the cursor 1210 may inherently capture a new two-dimensional coordinate (e.g., XY of the locked cursor 1210). FIG. 15 illustrates in the example views 1520A1 and 1520B1 that the user 90 head position has moved slightly: from a previous head pose in view 1520B1 to a current head pose in view 1520A1. This change in head pose may then be back projected on to the cursor screen to determine the XY position of the cursor 1210 on the cursor screen e.g., offset from (0.5,0.5) 1520B2 to (0.5,0.6) 1520A2, which may then be used to adjust the XY position of the cursor on the cursor screen 1206 (e.g., block 1540).

Next, at block 1530, a user input device movement is determined. This may be the change of the two-dimensional coordinate (e.g., XY) of the cursor 1210 on the cursor screen 1206 based on the new position of the contactor 3930 on the two-dimensional panel surface 3922 (e.g., view 1530B1) with reference to the previous position of the contactor 3930 on the two-dimensional panel surface 3922 (e.g., view 1530A1). If there is no change of the XY coordinates (e.g., between the positions of the contactor in views 1530A1 and 1530B1) then the cursor position may not have moved (at block 1540). If the XY coordinates are non-zero, this indicates that the contactor 3930 may be in range and an XY offset may be determined. In some embodiments, the correspondence of the contactor 3930 with the input device e.g., two-dimensional panel surface 3922, may be established the first time the contactor 3930 comes in range after the cursor 1210 is initially centered. In some embodiments, if the XY coordinates are zero, then the contactor 3930 may be out of range.

At block 1540, the two-dimensional position (e.g., XY coordinates) of the cursor 1210 on the cursor screen 1206 is adjusted based on the determined head movement compensation and user input device movement. For example, based on the determined ΔXΔY offset of the determined head movement compensation e.g., ΔX=0, ΔY=0.1 for (0.5,0.5) 1520B2 to (0.5,0.6) 1520A2, and the determined user input device movement e.g., ΔX=0.1, ΔY=0 for (0.5,0.5) 1530B2 to (0.6,0.5) 1530A2, the total ΔXΔY offset may be determined by summing the determined ΔX's and ΔY's. Additionally, the total determined ΔXΔY offset may be added to the previous two-dimensional XY position of the cursor 1210 on the cursor screen 1206 to adjust the two-dimensional position of the cursor 1210 on the cursor screen 1206 (blocks 1540, 1540A1-2).

Moving to block 1550, a ray is then cast from the adjusted two-dimensional position (e.g., XY of the cursor 1210 on the cursor screen 1206) to the cursor plane 1208 or a mesh 1212, whichever the ray collides with first e.g., first point of intersection, to determine an adjusted one-dimensional position (e.g., the Z position). At block 1560, the cursor location is then determined in real world coordinates based on the adjusted XY of the cursor 1210 on the cursor screen 1206 and the determined Z position. At block 1570, the cursor 1210 may then be displayed in three-dimensional space at the determined real world coordinate position. In view 1570A, the cursor 1210 is shown as re-projected from the cursor screen 1206 into three-dimensional real world space above the virtual object 1211 that initially defined the Z position in FIG. 14, based on the adjusted two-dimensional position (e.g. user input device movement and change of head pose), and one-dimensional position (e.g. Z position of first point of intersection of ray cast from the adjusted two-dimensional position).

Figure 16:
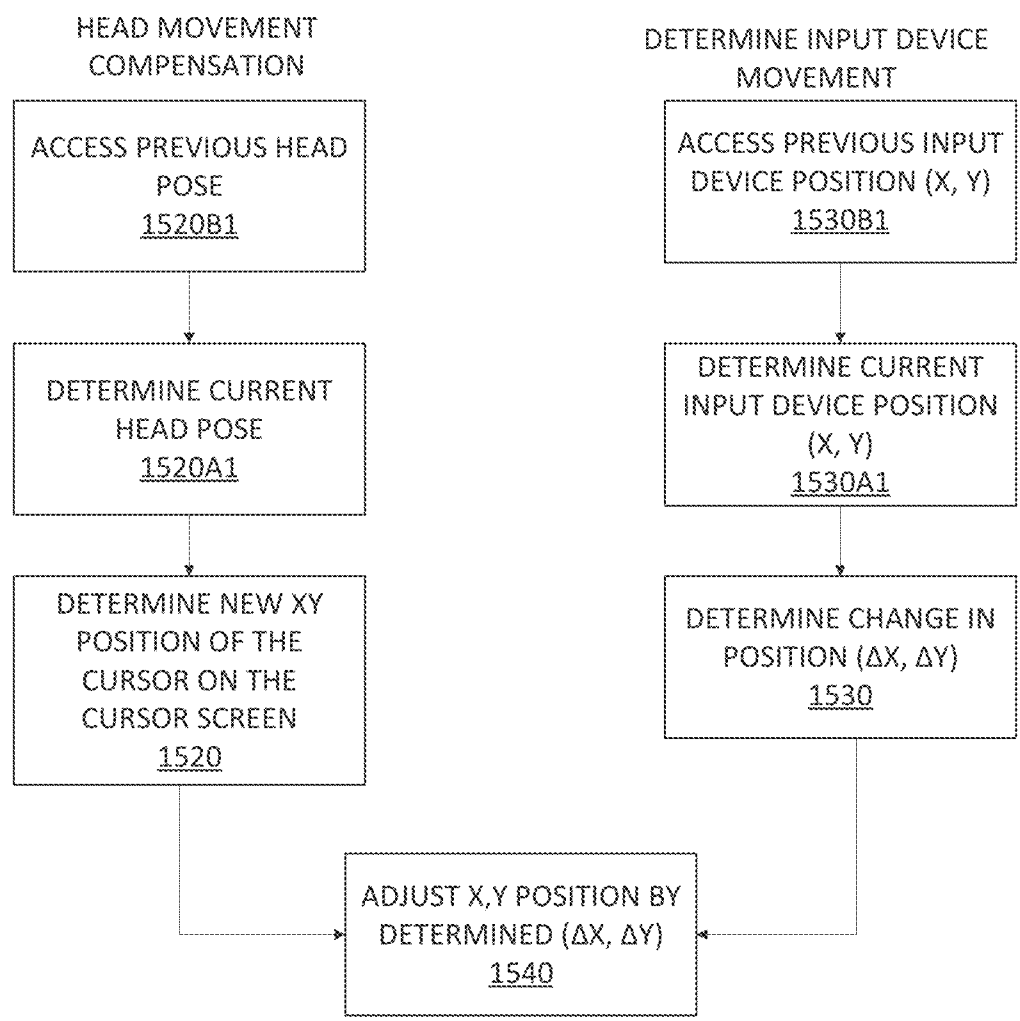
FIG. 16 illustrates a flowchart for determining a two-dimensional XY position on the cursor screen.

FIG. 16 illustrates a flowchart which further details the example interactive process for determining the two-dimensional position on the cursor screen 3920. Specifically the flowchart details how to determine the head movement compensation (e.g., block 1520 of FIG. 15A) and the input device movement (e.g., block 1530 of FIG. 15A) so that the X,Y position of the cursor 1210 may be adjusted on the cursor screen 1206 (e.g., block 1540 of FIG. 15B).

Figure 20:
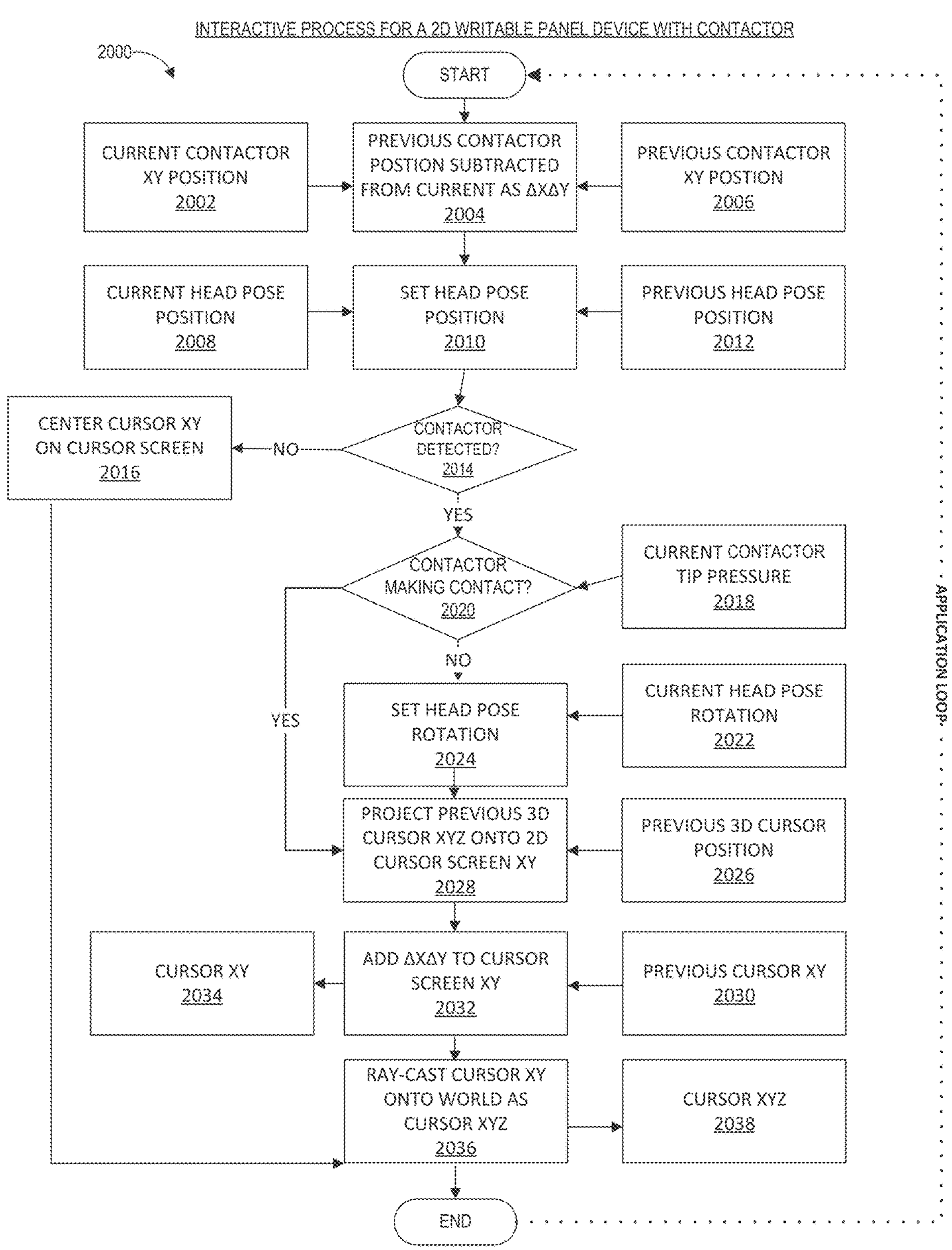
FIG. 20 further illustrates a flowchart of the example interactive process for a two-dimensional writable panel device with contactor.

FIG. 20 illustrates a flowchart 2000 which provides a specific example of an interactive process using a two-dimensional writable panel device 3920 with contactor 3930.

Fixed Plane and Fixed Mesh Examples

Figure 17A:
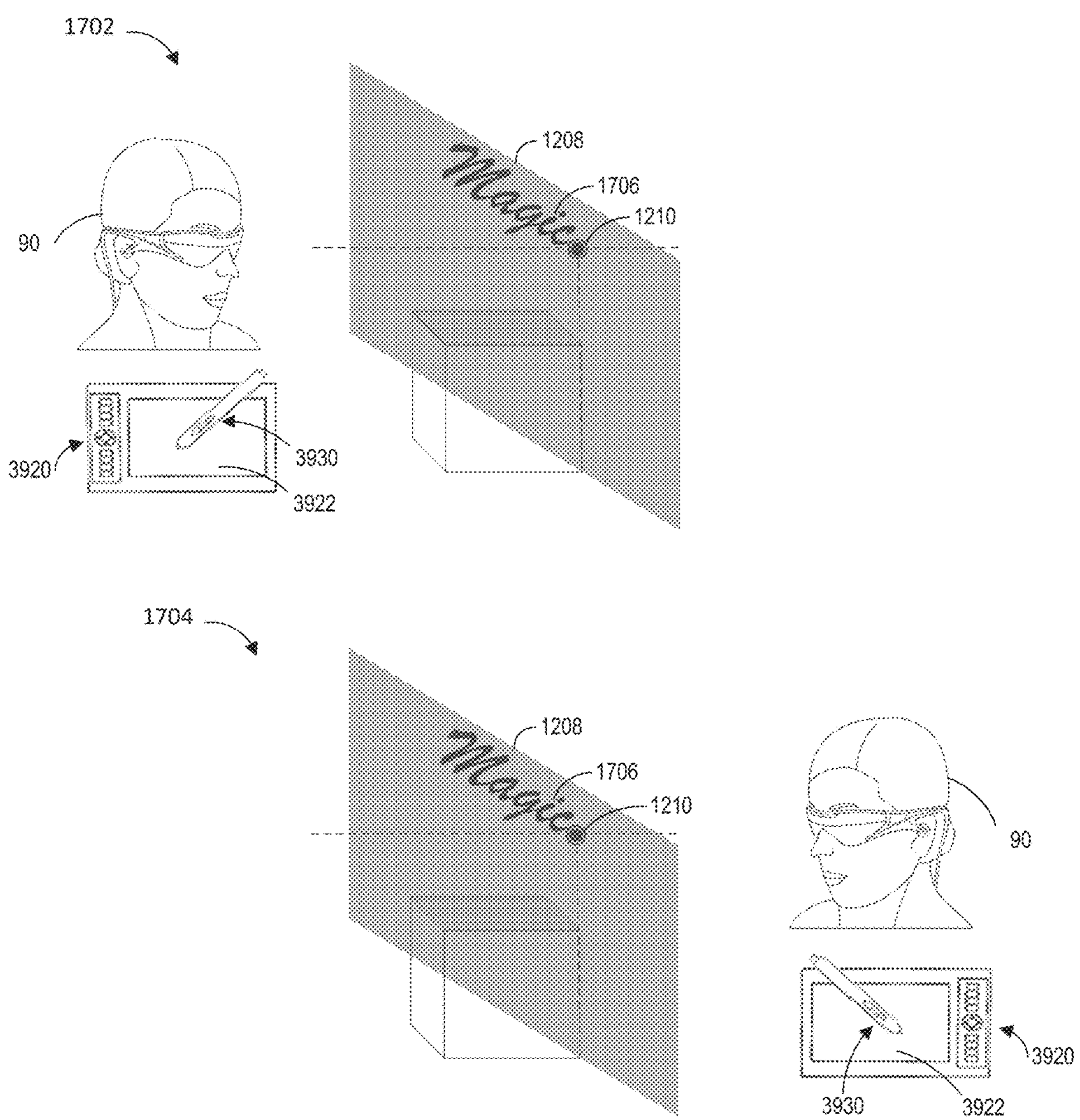
FIG. 17A illustrates a user view example depicting a fixed plane virtual annotation.
Figure 17B:
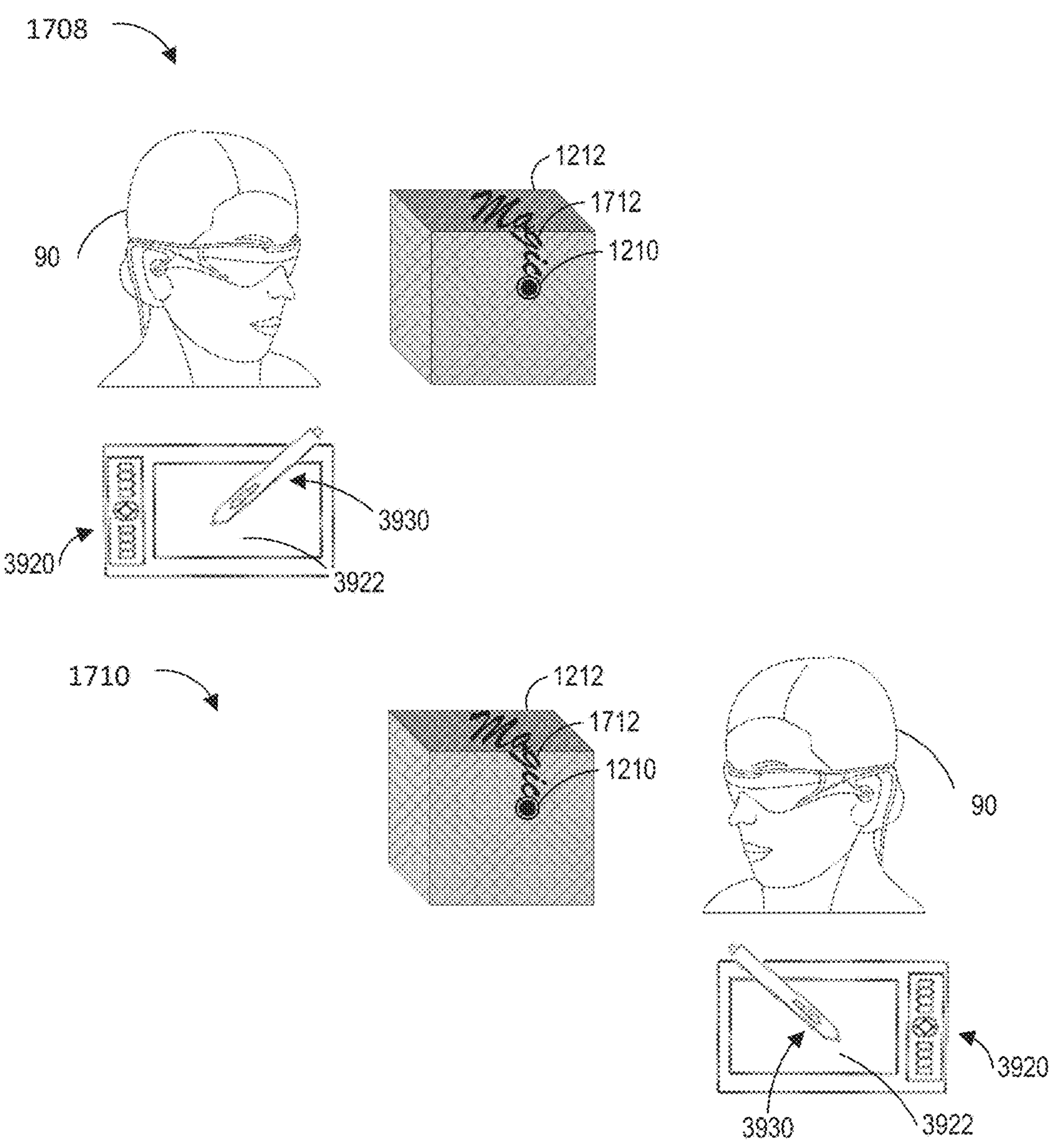
FIG. 17B illustrates a user view example depicting a fixed mesh annotation.

FIGS. 17A and 17B illustrate a user view example depicting a fixed plane virtual annotation and a fixed mesh annotation.

In FIG. 17A, a user 90 is using a two-dimensional writable panel 3920 and a contactor 3930 to draw and/or annotate on a fixed cursor plane 1208 by contacting the two-dimensional writable panel surface 3922 with the contactor 3930, applying pressure to the surface 3922, and dragging and/or touching the contacted contactor 3930 across the surface 3922. The user 90 may freely draw and/or annotate anywhere on the cursor plane allowing the user 90 to arbitrarily draw in open three-dimensional space. In some embodiments, the drawing and/or annotation may occur once the cursor 1210 has been visualized in three-dimensional space at the determined real world position (e.g., block 1460 of FIG. 14 or block 1570 of FIG. 15B). Moreover, the determined real world position may be on the cursor plane wherein the cursor plane is fixed in space.

Two user views 1702, 1704 are shown in FIG. 17A which depict the same augmented reality scene. As shown, once the cursor plane 1208 is fixed, any drawings, text etc. 1706 on the plane 1208 may also be fixed on to the cursor plane 1208. In some embodiments, the cursor plane 1208 is not visible to the user 90, thus giving the virtual content (drawings, text, etc.) the appearance of floating in free/open space (e.g. not attached to a real or virtual object). In some embodiments, the cursor plane 1208 may include a visible grid and/or pattern on the cursor plane 1208 to provide visual feedback to the user 90 as to its location in space. The user 90 may then be able to move around and view the stuck floating open space drawing, text etc. 1706 which are positioned in the original position and orientation which the user 90 drew, annotated etc. on the cursor plane 1208. In some embodiments, the cursor plane 1208 may be moved to various distances (e.g., one dimensional Z distances) by user input control such as to a maximum distance, minimum distance, incremental distance toward the user 90 and/or incremental distance away from the user 90. In some embodiments, the open space drawing, text etc. 1706 which may be fixed on the cursor plane 1208 may also move at the distance which the cursor plane 1208 moved via user input control.

In FIG. 17B a user 90 is using a two-dimensional writable panel 3920 and a contactor 3930 to draw and/or annotate on a fixed mesh 1212. In some embodiments, a fixed mesh 1212 may be mesh that appears to be stationary relative to the real world regardless of where the user 90 is located. The mesh 1212 encompasses real world objects, virtual objects, or mixed objects comprised of real and virtual objects. The user 90 may draw and/or annotate on the fixed mesh 1212 by contacting the two-dimensional writable panel surface 3922 with the contactor 3930, applying pressure to the surface 3922, and dragging the contacted contactor 3930 across the surface 3922. The user 90 may draw and/or annotate anywhere on the fixed mesh 1212 allowing the user 90 to continuously traverse or trace contours and features of the mesh 1212. In some embodiments, the drawing and/or annotation may occur once the cursor 1210 has been visualized in three-dimensional space at the determined real world position (e.g., block 1460 of FIG. 14 or block 1570 of FIG. 15B). Moreover, the determined real world position may be on the mesh that is fixed in space.

Two user views 1708, 1710 are shown in FIG. 17B which depict the same augmented reality scene. Once the cursor position is fixed on the mesh 1212 any drawings, text etc. on the mesh 1212 may also be fixed on to the mesh 1212. The user 90 may then be able to walk around and view the text, drawings etc. 1712 on the mesh 1212 which are positioned in the original position and orientation which the user 90 drew, annotated etc. on the cursor plane 1208.

The fixed mesh 1212 and/or fixed plane 1208 combined with the precision of the two-dimensional writable panel 3920 and the contactor 3930 may allow more stability to the user 90 when pin pointing, drawing, annotating, selecting, interacting, among other actions. The precision may also be due to the contactor's pressure sensor and design of the two-dimensional writable panel surface 3922. For example, in some embodiments the two-dimensional writable panel 3920 may be flat and light weight such that the user 90 may easily stabilize the two-dimensional writable panel 3920 so that the contactor 3930 may contact the surface 3922 precisely. Further, the systems and methods discussed herein may have the added benefits of an ergonomic design due to the panel's light weight, the option to provide additional support by placing a stabilizing hand underneath the panel 3920, and the position of the user's hand when holding the contactor 3930 to pinpoint, draw, annotate, select, interact, among other actions on the surface 3922 in a relaxed, natural, supported position leading to less arm fatigue and strain on the user's body.

Example Cursor Plane Process

Figure 18:
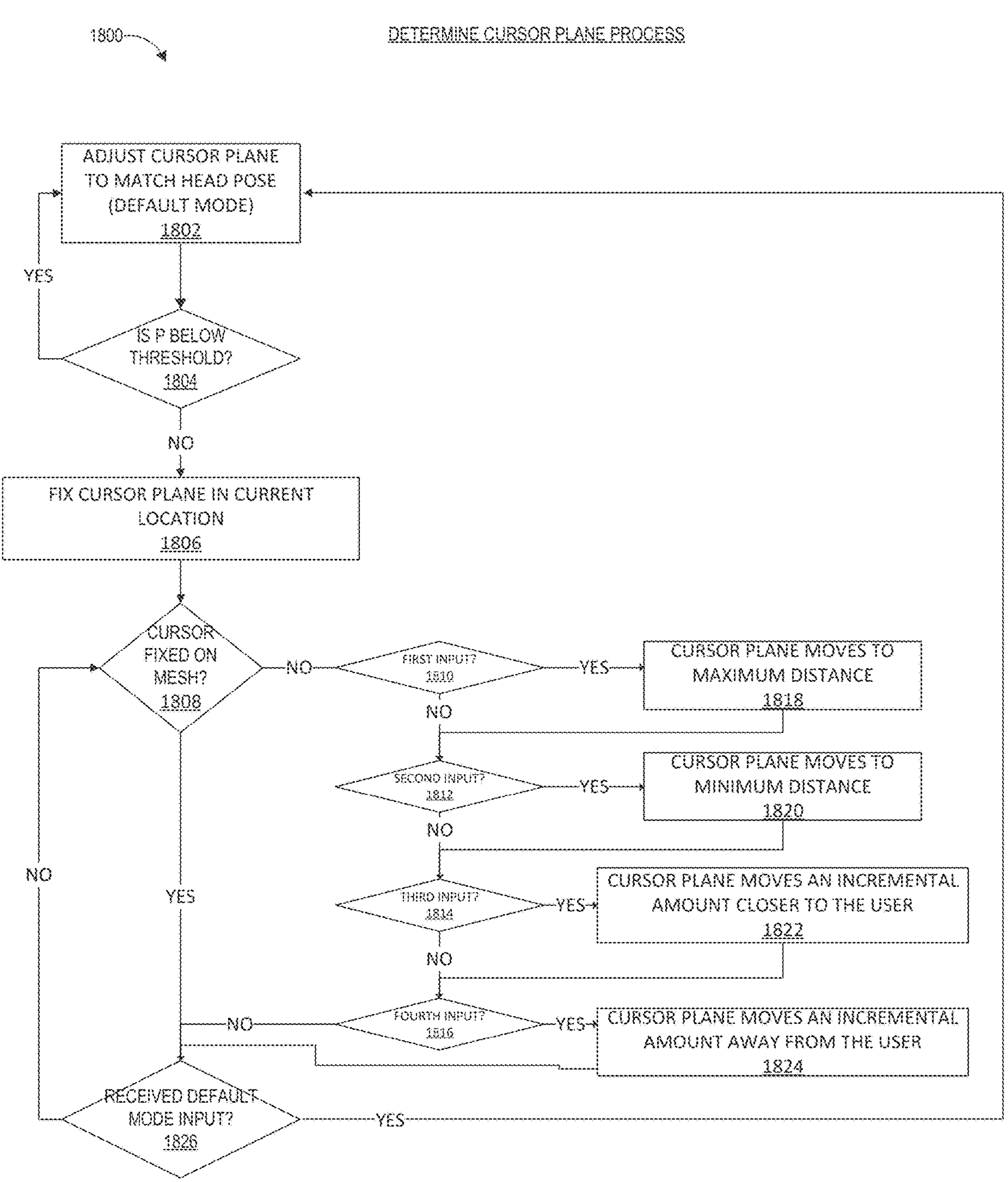
FIG. 18 illustrates a flowchart for determining a cursor plane.

FIG. 18 illustrates an example flowchart 1800 for determining a cursor plane 1208. This figure may further detail the cursor plane details of the startup process (e.g., blocks 1410 and 1420 of FIG. 14) and/or the interactive process (e.g., blocks 1540, 1550 and 1560 of FIG. 15B).

Beginning at block 1802, the cursor plane process of the system may begin in a default mode wherein the cursor plane 1208 may be automatically adjusted to match the head pose, in which the head pose includes a position and rotation. In some embodiments, the cursor plane 1208 may be adjusted to match the head pose via a cursor plane initialization (e.g., blocks 1410 and 1420 in FIG. 14) wherein once the head pose is determined, the cursor plane 1208 may be set at a defined distance from the view frustum origin point (e.g., 1214 from FIG. 12) that matches the head pose position and rotation. In some embodiments, the defined distance may be the distance from the view frustum origin point (e.g., 1214 from FIG. 12) to the far clipping plane of the view frustum. In some embodiments, the cursor plane 1208, may be adjusted to match the head pose via a user input from one or more pre-defined customizable buttons on a two-dimensional writable panel 3920, contactor 3930 or other user input device described herein. In some embodiments, the contactor 3930 may include a top user input button (e.g., 3938 of FIG. 10E) configured to trigger default mode (e.g., at block 1826 of FIG. 18).

Then at block 1804, a conditional check of the pressure (P) threshold state may occur. P threshold states may be further detailed in the FIG. 19 example Z position process section. In one embodiment, if P=0 then the threshold is not met and system remains in default mode. If P>0 then the threshold has been met and the cursor plane 1208 may be fixed in its current location at block 1806.

Then at block 1808, a conditional check of the cursor 1210 fixed on a mesh 1212 may occur such that if the cursor 1210 is not fixed on a mesh 1212 (e.g., a virtual or real-world object in the augmented reality environment) then a series of conditional checks for user inputs are performed at blocks 1810,1812,1814,1816. In general, these inputs allow the user to initiate movements of the cursor plane, such as to a location that is more convenient for annotation by the user. These user inputs may be pre-defined customizable buttons on a two-dimensional writable panel 3920, contactor 3930 or other user input device described herein.

At block 1810, if the first input has been received then the cursor plane 1208 may move to a maximum defined distance referring to block 1818. In an embodiment the max distance may be defined as 1 meter. In some embodiments, the contactor 3930 may include a bottom side user input button (e.g., 3934 of FIG. 10E) mapped as the first input that triggers movement of the cursor plane to a maximum defined distance. At block 1812, if the second input has been received then the cursor plane 1208 may move to a minimum defined distance referring to block 1820. In some embodiments, the contactor 3930 may include a top side user input button (e.g., 3936 of FIG. 10E) mapped as the second input that triggers movement of the cursor plane to a minimum defined distance. At block 1814, if the third input has been received then the cursor plane 1208 may move an incremental amount closer to the user 90 referring to block 1822. In an embodiment, the incremental amount may be defined as 0.1 meters. In some embodiments, the two-dimensional writable panel 3920 may include a directional user input button (e.g., 3926 of FIG. 10E), in which the bottom directional arrow of the directional user input button is mapped as the third input that triggers movement of the cursor plane to an incremental amount closer to the user 90. At block 1816, if the fourth input has been received then the cursor plane 1208 may move an incremental amount away from the user 90 referring to block 1824. In an embodiment, the incremental amount may be defined as 0.1 meters. In some embodiments, the two-dimensional writable panel 3920 may include a directional user input button (e.g., 3926 of FIG. 10E), in which the top directional arrow of the directional user input button is mapped as the fourth input that triggers movement of the cursor plane to an incremental amount away from the user 90.

Once the input checks have been performed in blocks 1810-1816, the method continues to block 1826. Similarly, if the cursor is determined to be fixed on a mesh at block 1808, the method continues to block 1826 where the system monitors for a default mode user input 1826. If the default mode input is received, the method returns to block 1802 where it returns to default mode and the cursor plane 1208 may be adjusted again to match the head pose. If the default mode user input is not received at block 1802, the method loops back to the conditional check of the cursor 1210 fixed on a mesh 1212 at block 1808.

Example Z Position Process

Figure 19:
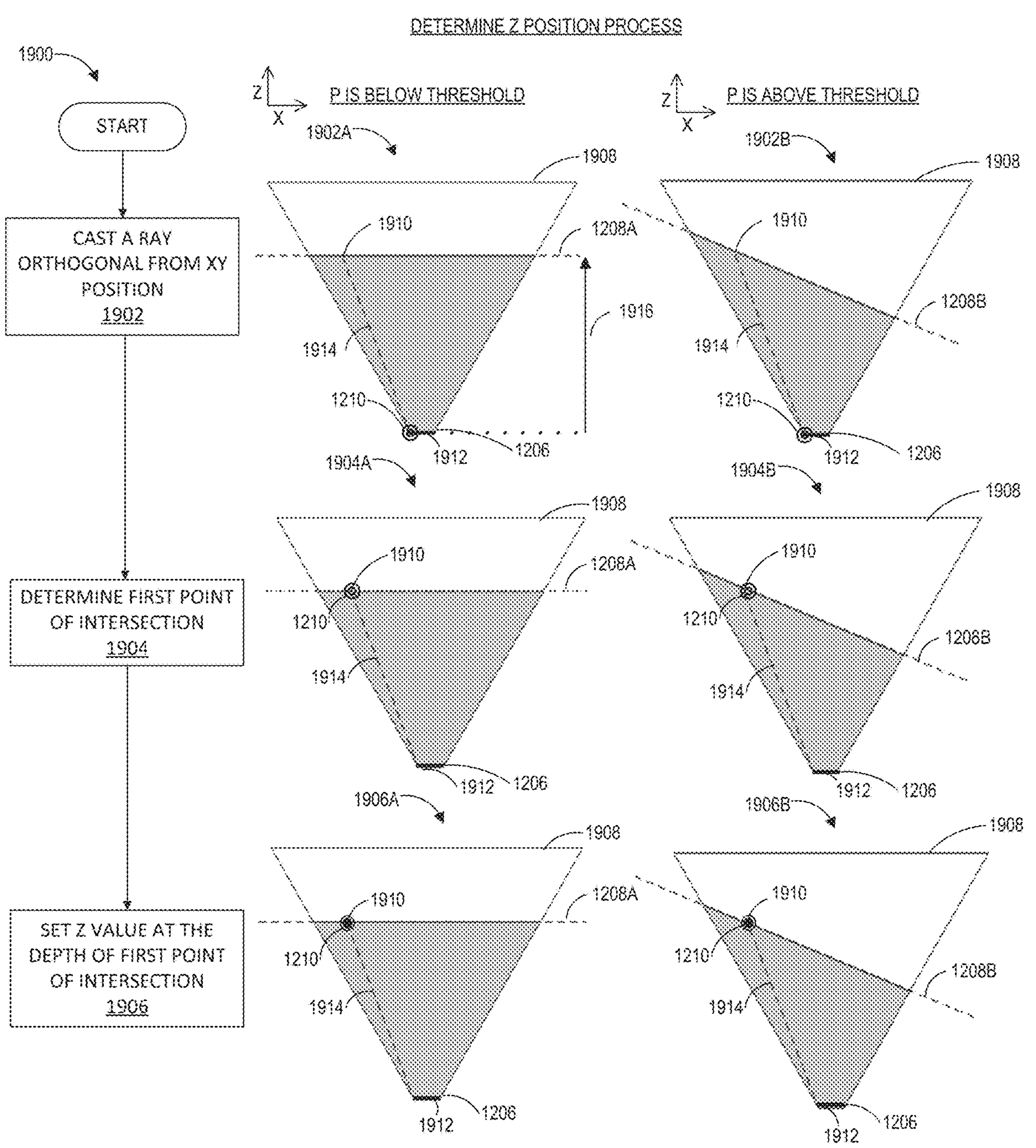
FIG. 19 illustrates a flowchart an example for determining a one-dimensional Z position with multiple bird's eye view examples per step.

FIG. 19 illustrates a flowchart 1900 for determining a one-dimensional Z position with top views of examples where the pressure (P) is below the threshold (e.g., not touching the touchpad) in views 1902A, 1904A, 1906A and where the pressure (P) is above the threshold (e.g., is touching the touchpad) in views 1902B, 1904B, 1906B. This figure further details the ray casting observed in the startup process e.g., blocks 1440, 1450 and 1460 of FIG. 14, and the interactive process e.g., blocks 1540, 1550 and 1560 of FIG. 15B.

Beginning at block 1902, a ray may be cast orthogonal 1914 from the two-dimensional (e.g., XY) cursor screen 1206 position to establish a three-dimensional (e.g., XYZ) location 1910 on the cursor plane 1908. The cursor screen 1206 may be positioned at or by the near clipping plane 1912. The ray may be further detailed as cast through the cursor screen 1206 near the start of the camera view frustum e.g., 1214 of FIG. 12. At block 1904, the ray is detected intersecting either the cursor plane 1208A-B (e.g., at or by the far clipping plane 1908) or augmented reality scene geometry e.g., a mesh 1212 located between the far 1908 and near clipping planes 1912.

The far clipping plane 1908 distance and/or the cursor plane 1208A-B may be adjustable by the user 90 via user input of pre-defined customizable buttons on a two-dimensional writable panel 3920, contactor 3930, or other user input device described herein.

There may be multiple different pressure (P) threshold states. In one example embodiment, the P threshold states may include:

- A first P=0 state may occur when the system is receiving two-dimensional position coordinates, e.g., XY of the cursor screen 1206 but the contactor 3930 is not contacting the two-dimensional writable panel 3920 (e.g., the contactor 3930 is in range (D>0) but not touching the two-dimensional writable panel surface 3922).
- A second P=0 state may occur when the system is not receiving two-dimensional position coordinates, e.g., XY of the cursor screen 1206 e.g., the contactor 3930 is out of detection range (D=0).
- A P>0 state may occur when the system is receiving two-dimensional position coordinates, e.g., XY of the cursor screen 1206 and the contactor 3930 is contacting the two-dimensional writable panel 3920 e.g., the contactor 3930 is in range (D>0) and is touching the two-dimensional writable panel surface 3922.

If P=0 (e.g., below threshold), then the cursor plane 1208A may be parallel to the cursor screen 1206 at a defined maximum distance 1916. However, if P>0 (e.g., above the threshold) then the cursor plane 1208B may be either parallel or at a fixed angle to the cursor screen 1206. The cursor plane 1208B may lock in place at the real world position of the cursor plane 1208B which may be angled at a fixed angle or parallel to the cursor screen 1206 e.g., the cursor plane 1208B position may lock in place at the cursor plane 1208B position in real world space rather than locking to the camera view frustum, when the user 90 applies pressure on the two-dimensional writable panel surface 3922 with the contactor 3930 or when user input from pre-defined customizable buttons on a two-dimensional writable panel 3920, contactor 3930, or other user input device described herein is received. In some embodiments, a drawing mode may be triggered when the cursor plane 1208B is locked in place e.g., P>0, in which the user may draw and/or annotate on the locked cursor plane 1208B. In some embodiments, a navigation mode may be triggered when the cursor plane 1208A is not locked in place e.g., P=0, and is parallel to the cursor screen 1206, in which the user may navigate and/or point freely with the cursor 1210 on the cursor plane 1208A.

Further the cursor screen 1206 two-dimensional position (e.g., XY), may adjust based on the previous frame. For example, the previous cursor 1210 two-dimensional position coordinates on the cursor screen 1206 may be (0,0) and the new coordinates may be (X,Y), wherein (X,Y) are non-zero. As the new coordinates adjusted from 0 to some value, this indicates that the contactor 3930 is in range (D>0). However, if for example the previous cursor coordinates may be some value and the new coordinates adjusted to 0, then this indicates that the contactor 3930 is out of range (D=0). If the previous cursor coordinates value may adjust from a non-zero value to another new non-zero value then the contactor 3930 has moved within range (D>0) in the detection space and the delta of the previous and new coordinates is used to determine ΔXΔY.

Ray casting (e.g., block 1902) may include calculation of a vector from the head pose origin point e.g., 1214 of FIG. 12, passing through the cursor screen 1206 and cast to the cursor plane 1208A-B. A ray may be returned going through the cursor screen 1206 and intersecting at a point at the cursor plane 1208A-B or an augmented reality scene geometry e.g., a mesh 1212. The resulting ray (e.g., block 1906) may be in real world space, starting from the cursor screen 1206 at or by the near clipping plane 1912 of a camera's viewing frustum, going through the cursor screen 1206 position e.g., X,Y coordinates on the cursor screen 1206, and ending at a first point of intersection 1910 e.g., Z position from the X,Y coordinates of the cursor screen 1206, on either the cursor plane 1208A-B or an augmented reality scene geometry e.g., a mesh 1212. In some embodiments, a layer mask may be used to filter out any colliders e.g., mesh 1212, so that the ray may avoid collision with the colliders e.g., they ray may not intersect with one or more mesh 1212 that are within the ray cast. The cursor screen 1206 may be defined in pixels but as described herein e.g., in the FIG. 13 cursor initialization, the cursor screen 1206 may be represented by homogeneous coordinates.

Example Block Diagram of System

FIG. 21 illustrates a block diagram of an example system for converting a two-dimensional positional input into a three-dimensional point in space 2100.

The system may include a two-dimensional writable panel 2102 (e.g., a XY tablet input device), a contactor 2114 (e.g., a multi-button stylus), and a wearable display system 2122 (e.g., a mixed reality computing device) coupled to a stereoscopic display 2124.

The two-dimensional writable panel 2102 may include some or all of the components of panel 3920 discussed above. In this example, the panel 2102 includes a body 2108 which further houses a surface 2106 (e.g., touch screen), multiple customizable buttons 2112 (e.g., directional buttons or user input buttons), a Bluetooth radio module 2110 further including a transmitter and receiver, and an Electromagnetic (EM) module 2104 further including a transmitter and an antenna.

The contactor 2114 (e.g., similar or same as contactor 3930 of FIG. 10E) may include multiple customizable buttons 2120, a pressure sensor 2118, and an EM module 2116 including an antenna, modulator, and transmitter.

The wearable display system 2122 (e.g., similar or same as wearable display system 60 of FIG. 9D) may include a Bluetooth radio module 2126 further including a transmitter and receiver, a kernel input driver 2128, an input framework standard development kit (SDK) 2130, a processing system 2136 containing an input processor 2138 containing a virtual camera 2142 to ray cast 2148 from the virtual cursor screen 1206 to a virtual cursor plane 1208, cursor screen project and cursor plane project 2146, a three-dimensional world content processor 2140 to generate a three-dimensional cursor 2144, a rendering engine 2132 including a graphics render pipeline 2134, and a stereoscopic display 2124.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A computerized method, performed by a computing system having one or more hardware computer processors and one or more non-transitory computer readable storage device storing software instructions executable by the computing system to perform the computerized method comprising: determining a head pose of a user associated with a wearable display device; determining a cursor screen position at a first distance from the wearable display device; determining a cursor plane position at a second distance from the wearable display device, the second distance representing a maximum distance; determining a two-dimensional position on the cursor screen; determining a one-dimensional position defined by at least one of the cursor plane or a mesh; and displaying a virtual object to the user at a three-dimensional position comprised of the two-dimensional position and the one dimensional position.

Example Two: The computerized method of Example One, wherein the head pose of the user determines a view frustum.

Example Three: The computerized method of Example Two, wherein the cursor screen is positioned closer to the wearable display device than to the cursor plane.

Example Four: The computerized method of Example Three, wherein the cursor screen bisects the view frustum.

Example Five: The computerized method of any of Examples One through Four, wherein the cursor plane is configured to have a maximum and minimum distance from the user.

Example Six: The computerized method of any of Examples One through Five, wherein the two-dimensional position on the cursor screen is a default two-dimensional position.

Example Seven: The computerized method of Example Six, wherein the default two-dimensional position is a center of the cursor screen.

Example Eight: The computerized method of any of Examples One through Seven, wherein the one-dimensional position is further defined by a first intersection of a ray cast orthogonal from a head pose origin associated with a position and a rotation.

Example Nine: The computerized method of Example Eight, wherein the first intersection is with at least one of the cursor plane or the mesh.

Example Ten: The computerized method of Example Nine, wherein the mesh comprises one or more real world, virtual, or mixed objects.

Example Eleven: The computerized method of any of Examples One through Ten, wherein the virtual object is a cursor.

Example Twelve: The computerized method of any of Examples One through Eleven, wherein the virtual object is a point or a line.

Example Thirteen: A computerized method, performed by a computing system having one or more hardware computer processors and one or more non-transitory computer readable storage device storing software instructions executable by the computing system to perform the computerized method comprising:

determining a head pose of a wearable headset; determining a two-dimensional position based at least on a detected interaction between a contactor operated by the user and a touch sensitive surface of an input device; receiving a range status indicating whether the contactor is within a predetermined distance of the touch sensitive surface; receiving a pressure status indicating a pressure of the contactor on the touch sensitive surface; determining a three-dimensional position within an augmented reality environment that includes one or more virtual objects and one or more real-world objects; determining a two-dimensional position on a cursor screen; determining a one-dimensional position on a cursor plane or a mesh associated with one of the virtual objects or real-world objects; identifying an intersection of the determined one-dimensional position within the augmented reality environment where an axis orthogonal to the determined two-dimensional position on the cursor screen intersects the cursor plane or the mesh associated with one of the virtual objects or real-world objects; determining an updated three-dimensional position within the augmented reality environment; and displaying a virtual object at the updated three-dimensional position within the augmented reality environment to the user in the wearable headset.

Example Fourteen: The computerized method of Example Thirteen, wherein at least one of the cursor plane or the mesh is fixed at the updated three-dimensional position.

Example Fifteen: The computerized method of Example Fourteen, further comprising displaying annotations at the updated three-dimensional position based on user interactions with the input device.

Example Sixteen: The computerized method of Example Fourteen, wherein the user draws on at least one of the cursor plane or the mesh.

Example Seventeen: The computerized method of Example Thirteen, further comprising: determining a head movement compensation based on a change in at least one of an orientation and a position from a previous head pose and the head pose.

Example Eighteen: The computerized method of Example Seventeen, wherein the determined head movement compensation is a two-dimensional offset.

Example Nineteen: The computerized method of Example Eighteen, wherein the three-dimensional position is back projected on to the two-dimensional cursor screen by using the determined head movement compensation offset.

Example Twenty: The computerized method of Example Thirteen, further comprising: determining an input device movement based on a change in a previous two-dimensional position and the two-dimensional position, based at least on a detected interaction between a contactor operated by the user and a touch sensitive surface of an input device.

Example Twenty-one: The computerized method of Example Twenty, wherein the determined input device movement is a two-dimensional offset.

Example Twenty-two: The computerized method of Examples Eighteen and Twenty-one, wherein the determined head movement compensation offset and the determined input device movement offset are summed to determine a total two-dimensional offset.

Example Twenty-three: The computerized method of Example Twenty-two, wherein the total two-dimensional offset is used to determine the two-dimensional position on the cursor screen.

Example Twenty-four: The computerized method of Example Thirteen, wherein a ray is cast from the two-dimensional position on the cursor screen to the cursor plane or the mesh associated with one of the virtual objects or real-world objects.

Example Twenty-five: The computerized method of Example Twenty-four, wherein the ray cast ray traces from the two-dimensional position on the cursor screen to the cursor plane or the mesh associated with one of the virtual objects or real-world objects to determine the one-dimensional position on the cursor plane.

Example Twenty-six: The computerized method of Example Thirteen, wherein the determined two-dimensional position on the cursor screen and the identified intersection of the determined one-dimensional position on the cursor plane or the mesh associated with one of the virtual objects or real-world objects are used to determine the updated three-dimensional position within the augmented reality environment.

Example Twenty-seven: The computerized method of Example Thirteen, wherein the virtual object is a cursor.

Example Twenty-eight: The computerized method of Example Thirteen, wherein the virtual object is a point or a line.

Example Twenty-nine: A system for converting a two-dimensional positional input into a three-dimensional position for visualizing augmented reality, the system comprising: a wearable headset; one or more user input devices; one or more non-transitory computer readable storage mediums having program instructions embodied therewith; and one or more processors configured to execute the program instructions to cause the system to: determine a head pose of the wearable headset; determine a two-dimensional position based at least on a detected interaction between a contactor operated by the user and a touch sensitive surface of an input device; receive a range status indicating whether the contactor is within a predetermined distance of the touch sensitive surface; receive a pressure status indicating a pressure of the contactor on the touch sensitive surface; determine a three-dimensional position within an augmented reality environment that includes one or more virtual objects and one or more real-world objects; determine a two-dimensional position on a cursor screen; determine a one-dimensional position on a cursor plane or a mesh associated with one of the virtual objects or real-world objects; identify an intersection of the determined one-dimensional position within the augmented reality environment where an axis orthogonal to the determined two dimensional position on the cursor screen intersects the cursor plane or the mesh associated with one of the virtual objects or real-world objects; determine an updated three-dimensional position within the augmented reality environment; and display a virtual object at the updated three-dimensional position within the augmented reality environment to the user in the wearable headset.

Example Thirty: The system of Example Twenty-nine, wherein the user input device is a two-dimensional writable panel.

Example Thirty-one: The system of Example Thirty, wherein the two-dimensional writable panel is at least one of a tablet, smartphone, or pen display.

Example Thirty-two: The system of Example Thirty, wherein the two-dimensional writable panel comprises a Bluetooth radio module, Electromagnetic (EM) antenna and EM transmitter, wherein the two-dimensional writable panel communicates to the wearable display device by Bluetooth and wherein the two-dimensional writable panel communicates with a contactor by at least one of Bluetooth or Electromagnetic wave.

Example Thirty-three: The system of Example Thirty-two, wherein the contactor is at least one of a stylus, pen or electronic pen.

Example Thirty-four: The system of Example Thirty-two, wherein the contactor comprises a plurality of user input buttons configured to at least one of move the cursor plane to match the head pose of the user, move the cursor plane a maximum distance, move the cursor plane a minimum distance, move the cursor plane an incremental amount closer to the user, and move the cursor plane an incremental amount away from the user.

As noted above, implementations of the described examples provided above may include hardware, a method or process, and/or computer software on a computer-accessible medium.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:

determining a head pose of a user associated with a wearable display device;

determining a cursor screen position at a first distance from the wearable display device;

determining a cursor plane position at a second distance from the wearable display device;

determining a two-dimensional position on the cursor screen;

determining a one-dimensional position defined by at least one of the cursor plane or a mesh, wherein the one-dimensional position is further defined by a first intersection of a ray cast from the two-dimensional position on the cursor screen; and displaying a virtual object to the user at a three-dimensional position comprised of the two-dimensional position and the one-dimensional position.

2. The computerized method of claim 1, wherein the head pose of the user determines a view frustum.

3. The computerized method of claim 2, wherein the cursor screen is positioned closer to the wearable display device than to the cursor plane.

4. The computerized method of claim 1, wherein the virtual object is a cursor.

5. The computerized method of claim 1, wherein the virtual object is a point or a line.

6. The computerized method of claim 1, wherein the cursor plane or the mesh includes at least one of a visible grid or pattern to indicate location in space.

7. A computerized method, performed by a computing system having one or more hardware computer processors and one or more non-transitory computer readable storage device storing software instructions executable by the computing system to perform the computerized method comprising:

determining a head pose of a user associated with a wearable display device, wherein the head pose of the user determines a view frustum;

determining a cursor screen position at a first distance from the wearable display device;

determining a cursor plane position at a second distance from the wearable display device;

determining a two-dimensional position on the cursor screen;

determining a one-dimensional position defined by at least one of the cursor plane or a mesh; and displaying a virtual object to the user at a three-dimensional position comprised of the two-dimensional position and the one-dimensional position, wherein the cursor screen bisects the view frustum.

8. The computerized method of claim 1, wherein the cursor plane is configured to have a maximum and minimum distance from the user.

9. The computerized method of claim 1, wherein the two-dimensional position on the cursor screen is a default two-dimensional position.

10. The computerized method of claim 1, wherein the two-dimensional position on the cursor screen is set by user input.

11. The computerized method of claim 1, wherein the first intersection is with at least one of the cursor plane or the mesh.

12. The computerized method of claim 11, wherein the mesh comprises one or more real world, virtual, or mixed objects.

13. A system for converting a two-dimensional positional input into a three-dimensional position for visualizing augmented reality, the system comprising:

a wearable headset;

one or more non-transitory computer readable storage mediums having program instructions embodied therewith; and one or more processors configured to execute the program instructions to cause the system to:

determine a three-dimensional position within an augmented reality environment that includes one or more virtual objects and one or more real-world objects;

determine a two-dimensional position on a cursor screen based on a first two-dimensional offset and a second two-dimensional offset;

determine a one-dimensional position on a cursor plane or a mesh associated with one of the virtual objects or real-world objects;

identify an intersection of the determined one-dimensional position within the augmented reality environment where an axis orthogonal from a head pose origin associated with a position and a rotation, through the determined two-dimensional position on the cursor screen, and intersecting the cursor plane or the mesh associated with one of the virtual objects or real-world objects;

determine an updated three-dimensional position within the augmented reality environment; and display a virtual object at the updated three-dimensional position within the augmented reality environment to a user via the wearable headset.

14. The system of claim 13, wherein at least one of the cursor plane or the mesh is fixed at the updated three-dimensional position.

15. The system of claim 14, further comprising displaying annotations at the updated three-dimensional position based on user interactions with a user input device.

16. The system of claim 14, wherein the user draws on at least one of the cursor plane or the mesh.

17. The system of claim 13, further comprising:

determining a head movement compensation based on a change in at least one of an orientation and a position from a previous head pose and the head pose.

18. The system of claim 17, wherein the determined head movement compensation is a two-dimensional offset.

19. The system of claim 18, wherein the three-dimensional position is back projected on to the cursor screen by using the determined head movement compensation offset.

* * * * *